United States Patent
Nishida et al.

(10) Patent No.: US 7,907,734 B2
(45) Date of Patent: Mar. 15, 2011

(54) KEY DISTRIBUTION CONTROL APPARATUS, RADIO BASE STATION APPARATUS, AND COMMUNICATION SYSTEM

(75) Inventors: Kaoru Nishida, Kanagawa (JP); Satoshi Iino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 798 days.

(21) Appl. No.: 11/817,623

(22) PCT Filed: Feb. 28, 2006

(86) PCT No.: PCT/JP2006/303780
§ 371 (c)(1),
(2), (4) Date: Aug. 31, 2007

(87) PCT Pub. No.: WO2006/093161
PCT Pub. Date: Sep. 8, 2006

(65) Prior Publication Data
US 2009/0052674 A1 Feb. 26, 2009

(30) Foreign Application Priority Data

Mar. 4, 2005 (JP) ................. 2005-060517
Mar. 28, 2005 (JP) ................. 2005-092199

(51) Int. Cl.
*H04L 9/00* (2006.01)
(52) U.S. Cl. ............................ 380/277; 380/278; 380/44
(58) Field of Classification Search .......... 380/260–261, 380/270, 44, 277–278, 168–171; 713/168–171; 726/2–3
See application file for complete search history.

(56) References Cited

U.S. PATENT DOCUMENTS

2005/0152305 A1* 7/2005 Ji et al. ..................... 370/328
2006/0101273 A1 5/2006 Tan et al.

FOREIGN PATENT DOCUMENTS

| JP | 2002124952 | 4/2002 |
| JP | 2004208073 | 7/2004 |
| WO | 2004034645 | 4/2004 |

OTHER PUBLICATIONS

PCT International Search Report dated May 23, 2006.
IEEE Std 802.11i, IEEE Standard for Information technology—Telecommunications and information exchange between systems—Local and metropolitan area networks—Specific requirements, Part 11: Wireless LAN Medium Access Control (MAC) and Physical Layer (PHY) specifications, Jul. 2004, pp. 1-175.
P. Calhoun,et al.; "Light Weight Access Point Protocol (LWAPP)," draft-ohara-capwap-lwapp-00, Nov. 6, 2004, pp. 1-67.

* cited by examiner

*Primary Examiner* — Hosuk Song
(74) *Attorney, Agent, or Firm* — Seed IP Law Group PLLC

(57) ABSTRACT

A key distribution control apparatus, a radio base station apparatus and a communication system for improving security. A communication system (10) comprises an Access controller (100), which serves as a key distribution control apparatus, a wireless LAN base station apparatus (200) and a communication terminal (300). The Access controller (100) performs an authentication of the communication terminal (300), and the wireless LAN base station apparatus (200) performs a decryption process in the communication with the communication terminal (300). A standard of 802.11*i* or WPA, which is specified on the precondition that the same device performs the authentication and the decryption process, is applied to the communication system (10). In this way, a wireless communication system that improves the security can be realized. Moreover, the security can be also improved with respect to the Access controller (100), which serves as the key distribution control apparatus, and the wireless LAN base station apparatus (200) both included in this wireless communication system.

10 Claims, 17 Drawing Sheets

KEY DISTRIBUTION CONTROL APPARATUS, RADIO BASE STATION APPARATUS, AND COMMUNICATION SYSTEM

TECHNICAL FIELD

The present invention relates to a key distribution control apparatus and radio base station apparatus, and a communication system equipped with this key distribution control apparatus and radio base station apparatus.

BACKGROUND ART

In recent years, the diffusion of wireless LANs (IEEE802.11 standard) has progressed, and large-scale wireless LAN networks have been constructed in public networks and corporate networks.

With wireless LANs, IEEE802.11i (Non-patent Document 1) aimed at strengthening security has been stipulated. Although authentication and periodic key updating in accordance with 802.1X are effective as short-term solutions to wireless LAN vulnerability, the vulnerability of the WEP itself remains a problem. Therefore, a new standard employing more robust encryption has been demanded, and the IEEE802.11i standard has been established as a result.

In 802.1X, only the form of an EAPol Key for key encapsulation is specified, and distribution thereof is effectively of a one-way notification type. With IEEE802.11i, in contrast, a two-way confirmation response type of key distribution procedure by means of a 4-way handshake procedure and group handshake procedure is specified, and master key synchronous authentication and temporary key updating can be performed dependably.

Meanwhile, with wireless LANs, investigation has been undertaken into shifting from a method whereby an access point (AP)—for example, a wireless LAN base station apparatus—is set and installed individually, to a method whereby an AP control apparatus that connects a plurality of wireless LAN base station apparatuses performs wireless LAN base station apparatus automatic setting, fault management, statistical information collection, and so forth, en bloc. This investigation has been carried out by international standard organizations such as the IETF (Internet Engineering Task Force) and IEEE802.11 Working Group, and progress is being made in drawing up standards.

Also, LWAPP (light weight access protocol) has been proposed by the IETF CAPWAP Working Group as a protocol for managing APs (see Non-patent Document 2). With this LWAPP, the AP control apparatus (also called an Access Controller) performs automatic setting of setting information, fault management, statistical information collection, encryption key information setting, and so forth, for a wireless LAN base station apparatus.

Non-patent Document 1: IETF 802.11i Standard
Non-patent Document 2: IETF draft draft-ohara-capwap-lwapp-00.txt "Light Weight Access Point Protocol"

DISCLOSURE OF INVENTION

Problems to be Solved by the Invention

With LWAPP, authentication is performed and an encryption key is generated by the Access controller, and a framework for performing encryption/decryption processing by a wireless LAN base station apparatus is suggested. However, when encryption/decryption processing is performed by a wireless LAN base station apparatus, it is necessary for a generated encryption key to be transmitted from the Access controller to the wireless LAN base station apparatus, but LWAPP only shows a framework for setting an encryption key by means of a key configuration request message from the Access controller to the wireless LAN base station apparatus, and does not indicate the actual procedure. Still less is there any suggestion of a method of effectively applying the new IEEE802.11i standard in which robust encryption is employed. At the same time, a method of strengthening security is not implemented in a communication system envisaged by LWAPP.

It is an object of the present invention to provide a key distribution control apparatus, radio base station apparatus, and communication system that improve security in a radio communication system.

Means for Solving the Problems

A key distribution control apparatus of the present invention distributes encryption key information used in communication between a communication terminal and a radio base station apparatus, and employs a configuration that includes: a control section that generates the encryption key information and sends that encryption key information in synchronization with sending of a message in an IEEE802.11i standard or WPA standard 4-way handshake procedure or group key handshake procedure; and a transmitting section that transmits information from the control section.

A radio base station apparatus of the present invention receives the encryption key information from the key distribution control apparatus, and employs a configuration that includes: a section that temporarily stores the received encryption key information; and a control section that applies the temporarily stored encryption key information to communication with the communication terminal, taking another message in a 4-way handshake procedure or group key handshake procedure as a trigger.

Advantageous Effect of the Invention

According to the present invention, a key distribution control apparatus, radio base station apparatus, and communication system can be provided that improve security in a radio communication system.

BEST MODE FOR CARRYING OUT THE INVENTION

Embodiments of the present invention will now be described in detail with reference to the accompanying drawings. In the embodiments, identical configuration elements are assigned the same codes, and redundant descriptions thereof are omitted.

Embodiment 1

Figure 1:
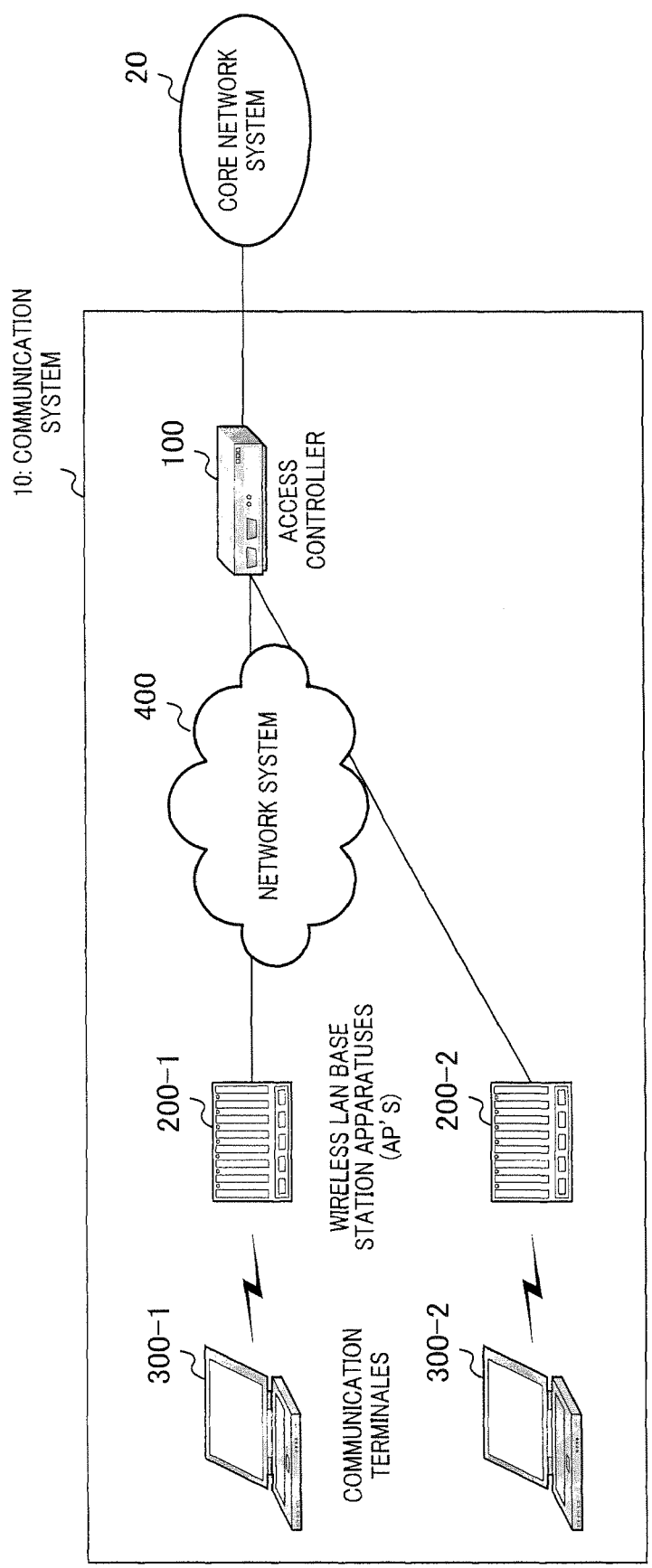
FIG. 1 is an overall configuration diagram of a communication system according to Embodiment 1 of the present invention.

As shown in FIG. 1, a communication system 10 of Embodiment 1 has communication terminates 300, wireless LAN base station apparatuses 200 accessed by communication terminates 300, an Access controller 100 as a key distribution control apparatus that distributes encryption key information used in communication between communication terminates 300 and wireless LAN base station apparatuses 200, and a network system 400. Access controller 100 is connected to a core network system 20.

Wireless LAN base station apparatuses 200 and communication terminates 300 are connected by a wireless LAN, with exchanges being performed by means of 802.11 frames. Wireless LAN base station apparatuses 200 and Access controller 100 are connected by means of a network system 400 such as Ethernet (registered trademark).

Security functions based on the IEEE802.11i standard are applied to communication system 10. Access controller 100 has a function that performs authentication of communication terminates 300, and wireless LAN base station apparatuses 200 have an encryption/decryption function for 802.11 frames exchanged between wireless LAN base station apparatuses 200 and communication terminates 300.

Figure 2:
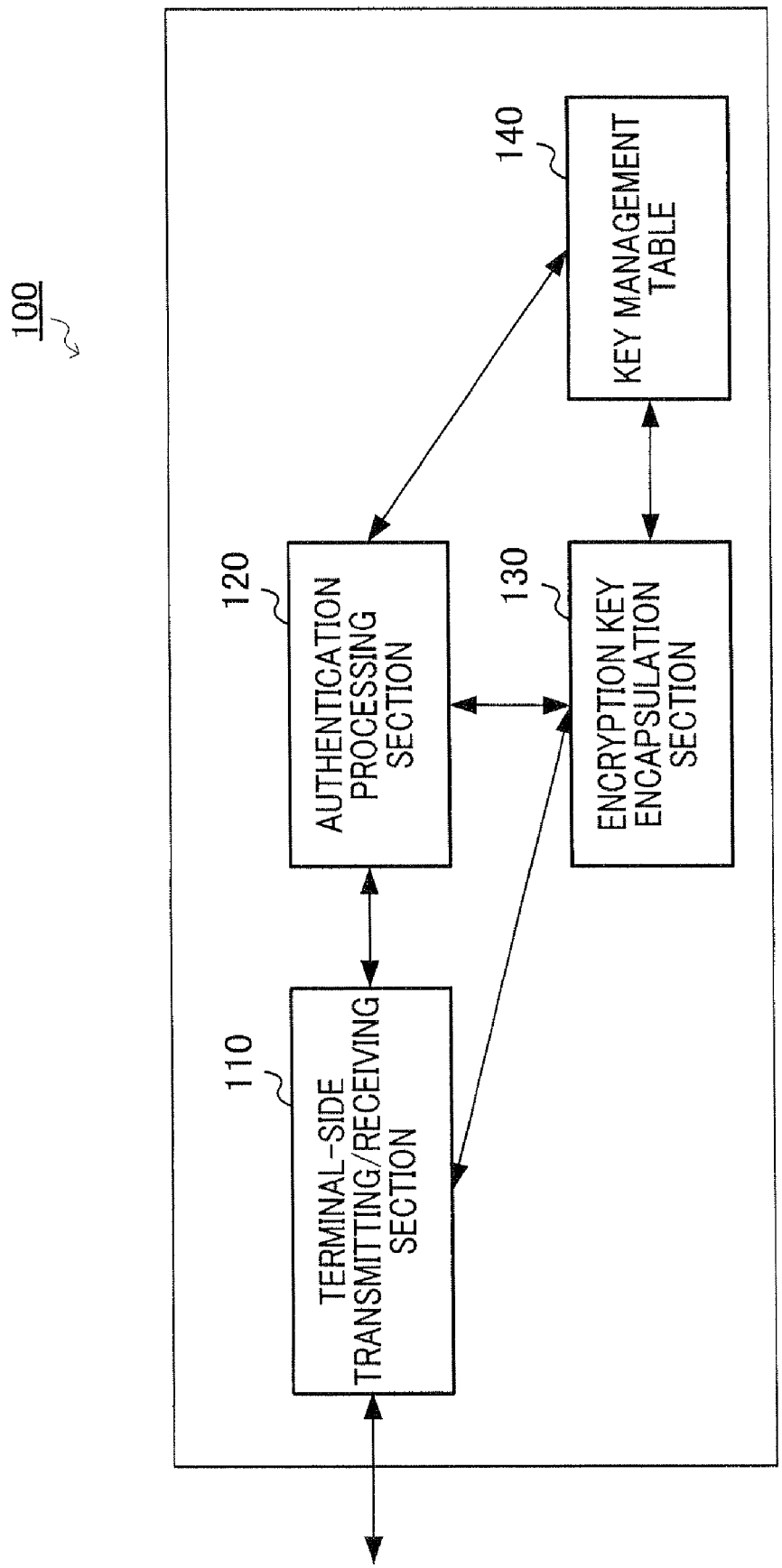
FIG. 2 is a block diagram showing the configuration of the Access controller in FIG. 1.

As shown in FIG. 2, Access controller 100 has a terminal-side transmitting/receiving section 110, an authentication processing section 120, an encryption key encapsulation section 130, and a key management table 140.

Terminal-side transmitting/receiving section 110 performs transmission and reception of frames exchanged with wireless LAN base station apparatuses 200.

Authentication processing section 120 performs authentication processing for communication terminal 300, generation of encryption keys used in communication between wireless LAN base station apparatuses 200 and Access controller 100, and so forth.

Key management table 140 is a table for managing encryption keys for each of communication terminals 300.

Encryption key encapsulation section 130 encapsulates an encryption key generated by authentication processing section 120 when that encryption key is set for a wireless LAN base station apparatus 200. An encapsulated encryption key is sent to a wireless LAN base station apparatus 200 via terminal-side transmitting/receiving section 110.

Figure 3:
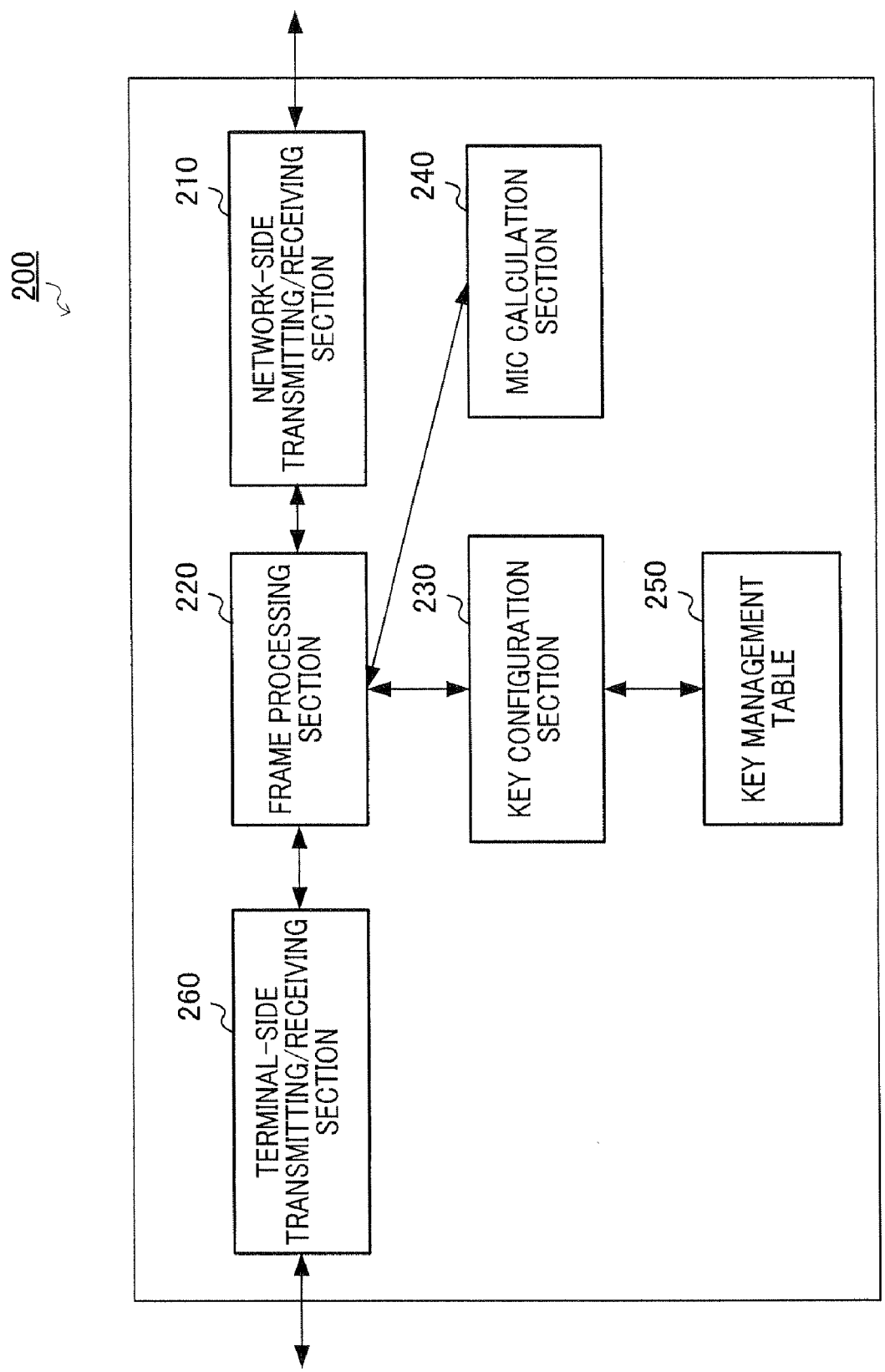
FIG. 3 is a block diagram showing the configuration of a wireless LAN base station apparatus in FIG. 1.

As shown in FIG. 3, a wireless LAN base station apparatus 200 has a network-side transmitting/receiving section 210, a frame processing section 220, a key configuration section 230, an MIC calculation section 240, a key management table 250, and a terminal-side transmitting/receiving section 260.

Network-side transmitting/receiving section 210 performs transmission and reception of frames exchanged with Access controller 100.

Frame processing section 220 performs output-destination assignment processing, encryption/decryption processing, and frame conversion processing for an input frame.

Key configuration section 230 performs key configuration and reflection of a key in key management table 250.

MIC calculation section 240 performs calculation of a Key MIC included in an EAPoL frame.

Key management table 250 is a table for managing encryption keys for each communication terminal 300.

Terminal-side transmitting/receiving section 260 performs transmission and reception of frames exchanged with communication terminates 300.

Next, the operation of communication system 10 having the above configuration will be described.

Figure 4:
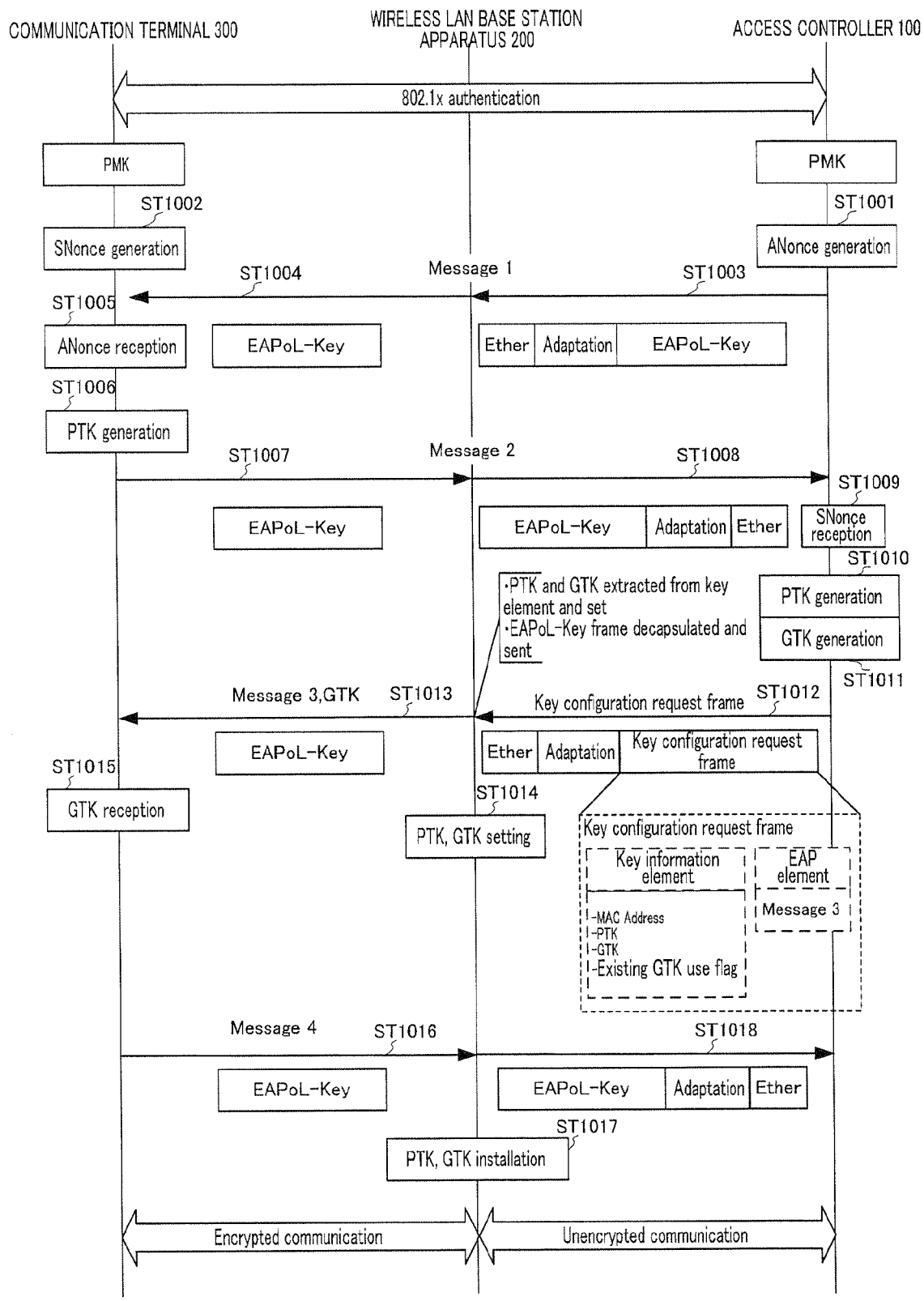
FIG. 4 is a chart explaining the operation of the communication system in FIG. 1.

FIG. 4 shows the operation of the 4-way handshake procedure stipulated in IEEE802.11i in communication system 10. In the 4-way handshake procedure, a message 1 through message 4 are exchanged between Access controller 100 and a communication terminal 300 via a wireless LAN base station apparatus 200. EAPoL-Key frames are used for these messages 1 through 4.

A PMK (Pairwise Master Key) is shared by Access controller 100 and communication terminal 300 by means of the same kind of authentication procedure as in 802.1x.

Then, in step ST1001, Access controller 100 generates an ANonce (Authenticator Nonce). This ANonce is a random number generated by Access controller 100.

On the other hand, in step ST1002, communication terminal 300 generates an SNonce (Supplicant Nonce). This SNonce is a random number generated by communication terminal 300.

When an ANonce is generated by Access controller 100, authentication processing section 120 transmits an EAPoL-Key frame (message 1) including that ANonce to wireless LAN base station apparatus 200 via terminal-side transmitting/receiving section 110 (step ST1003). In this embodiment, since Access controller 100 and wireless LAN base station apparatuses 200 are connected via Ethernet (registered trademark), the EAPoL-Key frame has an Ether header added, but the present invention is not limited to this case, and connection may be implemented by any communication method, no matter whether cable or radio. Thus, if the communication method changes, a header used in the relevant communication method is added instead of an Ether header.

In wireless LAN base station apparatus 200, network-side transmitting/receiving section 210 receives the above-described EAPoL-Key frame (message 1) transmitted from Access controller 100, and outputs this EAPoL-Key frame (message 1) to frame processing section 220. Then, when the EAPoL-Key frame (message 1) is input, frame processing section 220 removes the Ether header and transmits the EAPoL-Key frame (message 1) itself to communication terminal 300 via terminal-side transmitting/receiving section 260 (step ST1004).

In communication terminal 300, reception processing is performed for the ANonce included in the EAPoL-Key frame (message 1) (step ST1005).

Then, in step ST1006, communication terminal 300 generates a PTK (Pairwise Transient Key) based on the PMK, ANonce, and SNonce. Also, communication terminal 300 calculates a Key MIC using an EAPoL-Key KCK included in the generated PTK. Then communication terminal 300 provides the calculated Key MIC to an EAPoL-Key frame (message 2) including the SNonce, and transmits this EAPoL-Key frame (message 2) to wireless LAN base station apparatus 200 (step ST1007).

In wireless LAN base station apparatus 200, terminal-side transmitting/receiving section 260 receives the above-described EAPoL-Key frame (message 2) transmitted from communication terminal 300, and outputs this EAPoL-Key frame (message 2) to frame processing section 220. Then, when the EAPoL-Key frame (message 2) is input, frame processing section 220 adds a predetermined header (here, an Ether header), and transmits the EAPoL-Key frame (message 2) to Access controller 100 via network-side transmitting/receiving section 210 (step ST1008).

In Access controller 100, reception processing is performed for the SNonce included in the EAPoL-Key frame (message 2) (step ST1009).

Then, in step ST1010, Access controller 100 generates a PTK (Pairwise Transient Key) based on the PMK, ANonce, and SNonce. Here, it is assumed that Access controller 100 and communication terminal 300 share a PTK generated based on the PMK, ANonce, and SNonce using the same pseudorandom function. A Pairwise Transient Key is a temporary key actually used in unicast communication.

In step ST1011, Access controller 100 generates a GTK (Group Temporal Key) by means of a predetermined method. A GTK is a temporary key related to broadcast/multicast communication.

Then, in Access controller 100, authentication processing section 120 sends an EAPoL-Key frame (message 3), the generated PTK and GTK, and existing GTK use information to encryption key encapsulation section 130.

Existing GTK use information here is information indicating whether a GTK already transmitted to another communication terminal 300, or a newly created GTK, is to be used as the GTK to be distributed to communication terminal 300 shown in FIG. 4. Then, if, for example, a GTK already transmitted to another communication terminal 300 is to be used, authentication processing section 120 sets a flag indicating existing GTK use information to 1, whereas if a newly created GTK is to be used, authentication processing section 120 sets the flag indicating existing GTK use information to 0. When existing GTK use information is 0, authentication processing section 120 outputs the EAPoL-Key frame (message 3) with the Key RSC set to 0 and the PTK to an MIC calculation section (not shown) provided in Access controller 100 and causes a Key MIC to be calculated here, and overwrites the Key MIC area of the EAPoL-Key frame (message 3) with the calculated Key MIC. When the existing GTK use information is 1, authentication processing section 120 zeroizes the Key MIC area.

Encryption key encapsulation section 130 generates a key configuration request frame based on items of information received from authentication processing section 120. This key configuration request frame is composed of a key information element and an EAP element. The key information element includes a terminal MAC address, PTK, GTK, and existing GTK use information. The EAP element includes the EAPoL-Key frame (message 3) itself. By using this approach, when an EAPoL-Key frame (message 3) is transmitted in the IEEE802.11i procedure, including the PTK and GTK in a frame (key configuration request frame) identical to this enables wireless LAN base station apparatus 200 that receives this key configuration request frame to acquire the PTK and GTK that will later be necessary for encryption/decryption processing in communication with communication terminal 300. Also, by transmitting the EAPoL-Key frame (message 3), PTK, and GTK all included in the same frame (key configuration request frame) instead of sending them individually, the number of frames transmitted between wireless LAN base station apparatus 200 and communication terminal 300 is decreased, and traffic in the system can be reduced.

Then the key configuration request frame generated by encryption key encapsulation section 130 has a predetermined header (here, an Ether header) added, and is transmitted to wireless LAN base station apparatus 200 (step ST1012).

In wireless LAN base station apparatus 200, network-side transmitting/receiving section 210 receives the above-described key configuration request frame transmitted from Access controller 100, and outputs this key configuration request frame to frame processing section 220. Then, when the key configuration request frame is input, if the existing GTK use information is 1, frame processing section 220 outputs the PTK and EAPoL-Key frame (message 3) included in that key configuration request frame to MIC calculation section 240.

With regard to the GTK transmitted included in the same key configuration request frame, MIC calculation section 240 forms an EAPoL-Key frame (message 3) in which the Key RSC included in the EAPoL-Key frame (message 3) is overwritten with a GTK counter value currently held by wireless LAN base station apparatus 200. Also, MIC calculation section 240 generates a Key MIC based on the EAPoL-Key frame (message 3) including the above-mentioned Key RSC and the PTK from frame processing section 220 (actually, the EAPoL-Key KCK included in this PTK). A GTK counter value is a sequence counter value that is incremented when a wireless LAN base station apparatus sends a frame encrypted by means of a GTK.

In step ST1013, frame processing section 220 receives the EAPoL-Key frame (message 3) and Key MIC from MIC calculation section 240, and transmits an EAPoL-Key frame (message 3) in which that Key MIC is overwritten into this EAPoL-Key frame (message 3) to communication terminal 300 via terminal-side transmitting/receiving section 260. If the existing GTK use information is 0 when the key configuration request frame is received, frame processing section 220 transmits the EAPoL-Key frame (message 3) included in the key configuration request frame directly to communication terminal 300 via terminal-side transmitting/receiving section 260.

Frame processing section 220 outputs the PTK and GTK transmitted included in the key configuration request frame to key configuration section 230, and key configuration section 230 sets (stores) the PTK and GTK in key management table 250 (step ST1014).

In communication terminal 300, the EAPoL-Key frame (message 3) transmitted from wireless LAN base station apparatus 200 is received, and GTK reception processing is performed (step ST1015). Then communication terminal 300 transmits an EAPoL-Key frame (message 4) to wireless LAN base station apparatus 200 (step ST1016).

On receiving the EAPoL-Key frame (message 4) from communication terminal 300, wireless LAN base station apparatus 200 performs installation processing for the PTK and GTK set in step ST1014 (step ST1017). Specifically, terminal-side transmitting/receiving section 260 receives the above-described EAPoL-Key frame (message 4) transmitted from communication terminal 300, and outputs this EAPoL-Key frame (message 4) to frame processing section 220. Then, when the EAPoL-Key frame (message 4) is input, frame processing section 220 outputs an installation request to key configuration section 230. Key configuration section 230 then performs PTK and GTK installation processing corresponding to the installation request from frame processing section 220. By this means, a state is established in which it is possible to use the PTK and GTK used in actual encryption/decryption processing between communication terminal 300 and wireless LAN base station apparatus 200. That is to say, encrypted communication becomes possible between communication terminal 300 and wireless LAN base station apparatus 200.

Also, in wireless LAN base station apparatus 200, when the EAPoL-Key frame (message 4) is received, frame processing section 220 adds a predetermined header (here, an Ether header), and transmits the EAPoL-Key frame (message 4) to Access controller 100 via network-side transmitting/receiving section 210 (step ST1018).

Figure 5:
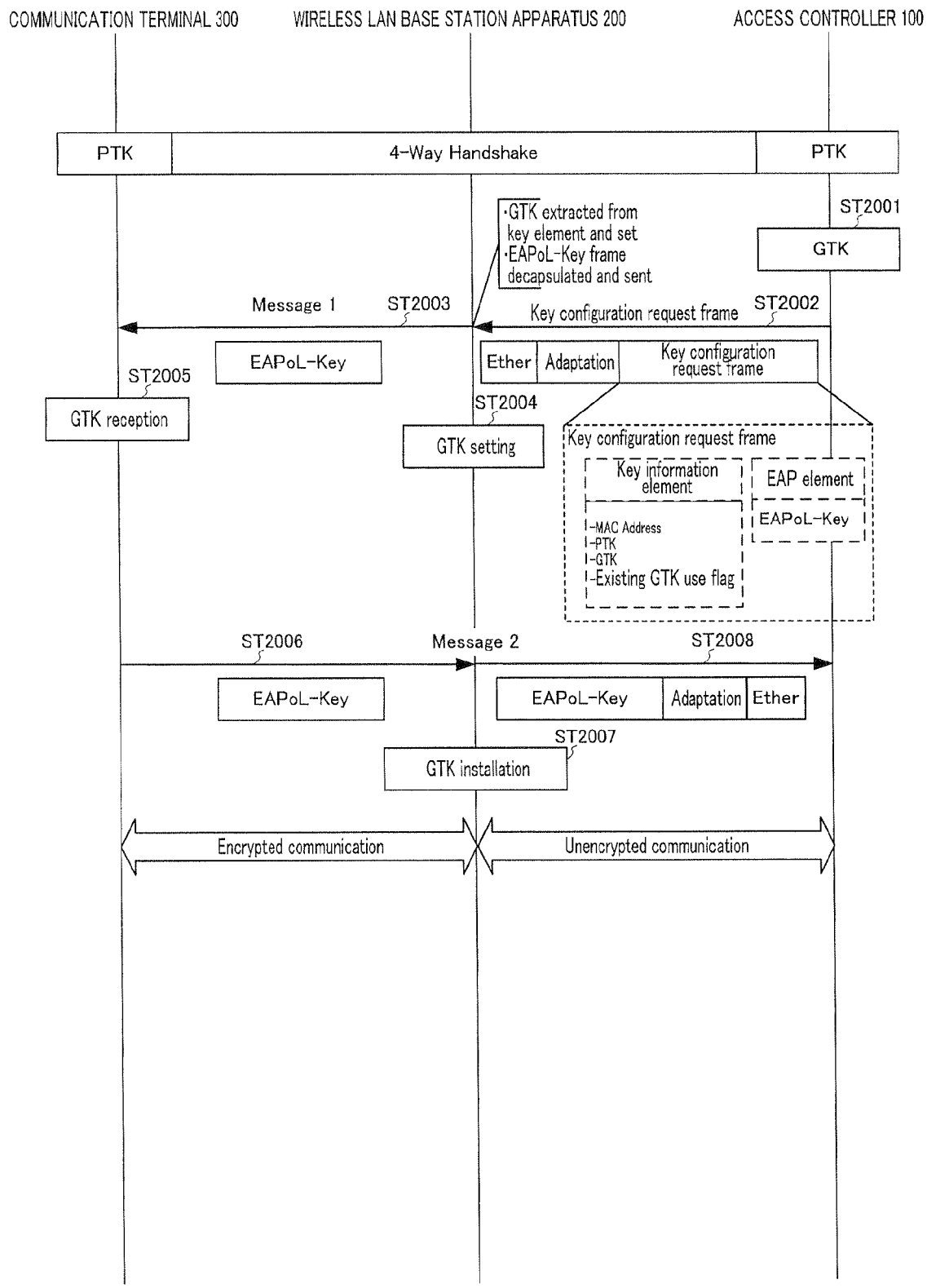
FIG. 5 is another chart explaining the operation of the communication system in FIG. 1.

FIG. 5 shows the operation of the group key handshake procedure stipulated in IEEE802.11i in communication system 10. In the group key handshake procedure, a message 1 and message 2 are exchanged between Access controller 100 and a communication terminal 300 via a wireless LAN base station apparatus 200. EAPoL-Key frames are used for these messages 1 and 2. The group key handshake procedure stipulated in IEEE802.11i is a procedure performed at fixed intervals for key updating after a PTK and GTK have been distributed by means of the 4-way handshake procedure. The group key handshake procedure is also performed when a key update request is issued to Access controller 100 from communication terminal 300, and when communication terminal 300 communication is cut off.

Access controller 100 and communication terminal 300 share a PTK and GTK by means of the 4-way handshake procedure stipulated in IEEE802.11i. It is here assumed that GTK updating is necessary for the same reason as described above.

In step ST2001, Access controller 100 prepares a GTK to be updated. Then in Access controller 100, authentication processing section 120 sends an EAPoL-Key frame (message 1) in the group key handshake procedure, a PTK, the prepared GTK (GTK after updating), and existing GTK use information to encryption key encapsulation section 130. Then, if, for example, a GTK already transmitted to another communication terminal 300 is to be used, authentication processing section 120 sets a flag indicating existing GTK use information to 1, whereas if a newly created GTK is to be used, authentication processing section 120 sets the flag indicating existing GTK use information to 0.

When existing GTK use information is 0, authentication processing section 120 outputs an EAPoL-Key frame (message 3) with the Key RSC set to 0 and the PTK to an MIC calculation section (not shown) provided in Access controller 100 and causes a Key MIC to be calculated here, and overwrites the Key MIC area of the EAPoL-Key frame (message 3) with the calculated Key MIC. When the existing GTK use information is 1, authentication processing section 120 zeroizes the Key MIC area.

Encryption key encapsulation section 130 generates a key configuration request frame based on items of information received from authentication processing section 120. This key configuration request frame is composed of a key information element and an EAP element. The key information element includes a terminal MAC address, PTK, GTK (GTK after updating), and existing GTK use information. The EAP element includes the EAPoL-Key frame (message 1) itself. By using this approach, when a group key handshake procedure EAPoL-Key frame (message 1) is transmitted in IEEE802.11i, including the GTK in a frame (key configuration request frame) identical to this enables wireless LAN base station apparatus 200 that receives this key configuration request frame to acquire the GTK (GTK after updating) that will later be necessary for encryption/decryption processing in communication with communication terminal 300. Also, by transmitting the group key handshake procedure EAPoL-Key frame (message 1), PTK, and GTK all included in the same frame (key configuration request frame) instead of sending them individually, the number of frames transmitted between wireless LAN base station apparatus 200 and communication terminal 300 is decreased, and traffic in the system can be reduced.

Then the key configuration request frame generated by encryption key encapsulation section 130 has a predetermined header (here, an Ether header) added, and is transmitted to wireless LAN base station apparatus 200 (step ST2002).

In wireless LAN base station apparatus 200, network-side transmitting/receiving section 210 receives the above-described key configuration request frame transmitted from Access controller 100, and outputs this key configuration request frame to frame processing section 220. Then, when the key configuration request frame is input, if the existing GTK use information is 1, frame processing section 220 outputs the PTK and group key handshake procedure EAPoL-Key frame (message 1) included in that key configuration request frame to MIC calculation section 240.

With regard to the GTK transmitted included in the same key configuration request frame, MIC calculation section 240 forms an EAPoL-Key frame (message 1) in which the Key RSC included in the EAPoL-Key frame (message 1) is overwritten with a GTK counter value currently held by wireless LAN base station apparatus 200. Also, MIC calculation section 240 generates a Key MIC based on the group key handshake procedure EAPoL-Key frame (message 1) including the above-mentioned Key RSC and the PTK from frame processing section 220 (actually, the EAPoL-Key KCK included in this PTK).

In step ST2003, frame processing section 220 receives the EAPoL-Key frame (message 1) and Key MIC from MIC calculation section 240, and transmits an EAPoL-Key frame (message 1) in which that Key MIC is overwritten into this EAPoL-Key frame (message 1) and GTK transmitted included in the key configuration request frame, to communication terminal 300 via terminal-side transmitting/receiving section 260. If the existing GTK use information is 0 when the key configuration request frame is received, frame processing section 220 transmits the group key handshake procedure EAPoL-Key frame (message 1) included in the key configuration request frame directly to communication terminal 300 via terminal-side transmitting/receiving section 260.

Frame processing section 220 outputs the PTK and GTK (GTK after updating) transmitted included in the key configuration request frame to key configuration section 230, and key configuration section 230 sets (stores) the GTK (GTK after updating) in key management table 250 (step ST2004).

In communication terminal 300, reception processing is performed for the GTK (GTK after updating) transmitted from wireless LAN base station apparatus 200 (step ST2005). Specifically, a Temporal Key included in the GTK (GTK after updating) is installed as a group key. Then communication terminal 300 transmits an EAPoL-Key frame (message 2) to wireless LAN base station apparatus 200 (step ST2006).

On receiving the EAPoL-Key frame (message 2) from communication terminal 300, wireless LAN base station apparatus 200 performs installation processing for the GTK (GTK after updating) set in step ST2004 (step ST 2007). Specifically, terminal-side transmitting/receiving section 260 receives the above-described EAPoL-Key frame (message 2) transmitted from communication terminal 300, and outputs this EAPoL-Key frame (message 2) to frame processing section 220. Then, when the EAPoL-Key frame (message 2) is input, frame processing section 220 outputs an installation request to key configuration section 230. Key configuration section 230 then performs GTK installation processing corresponding to the installation request from frame processing section 220. By this means, a state is established in which it is possible to use the GTK (GTK after updating) used in actual encryption/decryption processing between communication terminal 300 and wireless LAN base station apparatus 200. That is to say, encrypted communication becomes possible between communication terminal 300 and wireless LAN base station apparatus 200.

Also, in wireless LAN base station apparatus 200, when the EAPoL-Key frame (message 2) is received, frame processing section 220 adds a predetermined header (here, an Ether header), and transmits the EAPoL-Key frame (message 2) to Access controller 100 via network-side transmitting/receiving section 210 (step ST2008).

In the above description, it has been assumed that wireless LAN base station apparatus 200 and communication terminal 300 are connected by means of a wireless LAN, and wireless LAN base station apparatus 200 and Access controller 100 are connected by means of Ethernet. However, the present invention is not limited to this case, and as long as wireless LAN base station apparatus 200 and communication terminal 300 are connected by radio, the IEEE802.16 standard, for example, may be used. Also, wireless LAN base station apparatus 200 and Access controller 100 may be connected by any communication method, no matter whether cable or radio.

Also, in the above description, the application of security functions based on the IEEE802.11i standard has been assumed. However, the present invention is not limited to this case, and security functions based on the WPA (Wi-Fi Protected Access) standard may also be applied. If security functions based on the WPA (Wi-Fi Protected Access) standard are applied, the chart shown in FIG. 4 is partially modified. Specifically, in step ST1012 and step ST1013 in FIG. 4, the EAPoL-Key frame (message 1) is transmitted with a GTK not included therein. As a result, step ST1015 GTK reception processing and step ST1014 GTK setting processing are not performed. However, after step ST1018, inclusion of a message equivalent to message 3 and a GTK in the same frame is performed.

Furthermore, in the above description, when an IEEE802.11i stipulated 4-way handshake procedure EAPoL-Key frame (message 3) or group key handshake procedure EAPoL-Key frame (message 1) is transmitted to communication terminal 300, Key MIC calculation is performed by MIC calculation section 240 of wireless LAN base station apparatus 200 only when an existing GTK is used. However, the present invention is not limited to this case, and Key MIC calculation may be performed in wireless LAN base station apparatus 200 irrespective of whether an existing GTK is used. That is to say, Key MIC calculation is not performed in Access controller 100 in this case, regardless of existing GTK use information.

A detailed description will now be given with reference to FIG. 4. It will be assumed that a PTK and GTK are generated in step ST1010 and step ST1011, and this GTK is a newly created GTK. In this case, EAPoL-Key frame (message 3) creation is performed without Key MIC part calculation, regardless of the existing GTK use flag. Then the EAPoL-Key frame (message 3), the generated PTK and GTK, and existing GTK use information are sent to encryption key encapsulation section 130.

Encryption key encapsulation section 130 generates a key configuration request frame based on items of information received from authentication processing section 120. Then, in step ST1012, that key configuration request frame has a predetermined header (here, an Ether header) added, and is transmitted to wireless LAN base station apparatus 200 (step ST1012).

In wireless LAN base station apparatus 200, when the key configuration request frame is input, frame processing section 220 determines existing GTK use information of the key configuration request frame, and if this flag is 0, resets the currently held GTK counter value to 0. If this flag is 1, the current GTK counter value is reflected in the Key RSC. Following this, a PTK included in the key configuration request frame and an EAPoL-Key frame (message 3) are output to MIC calculation section 240.

Then MIC calculation section 240 generates a Key MIC based on the EAPoL-Key frame (message 3) including the Key RSC and the PTK from frame processing section 220 (actually, the EAPoL-Key KCK included in this PTK).

In step ST1013, frame processing section 220 receives the EAPoL-Key frame (message 3) and Key MIC from MIC calculation section 240, and transmits an EAPoL-Key frame (message 3) in which that Key MIC is overwritten into this EAPoL-Key frame (message 3) to communication terminal 300 via terminal-side transmitting/receiving section 260.

Thus, according to Embodiment 1, the IEEE802.11i standard or WPA standard stipulated on the assumption that authentication and encryption/decryption processing are performed by the same device can be applied to a communication system 10 having an Access controller 100 as a key distribution control apparatus, a wireless LAN base station apparatus 200, and a communication terminal 300, wherein communication terminal 300 authentication is performed by Access controller 100, and encryption/decryption processing in communication with communication terminal 300 is performed by wireless LAN base station apparatus 200, enabling a radio communication system that improves security to be realized.

In FIG. 4, user data communication between wireless LAN base station apparatus 200 and Access controller 100 after step ST1017 is unencrypted communication, but this means that wireless LAN encrypted communication is not performed, and it goes without saying that security measures of some kind should be provided between wireless LAN base station apparatus 200 and Access controller 100 in order to convey a PTK and GTK securely.

According to Embodiment 1, Access controller 100 is provided with a control section (comprising authentication processing section 120 and encryption key encapsulation section 130) that generates encryption key information (PTK, GTK) and transmits that encryption key information (PTK, GTK) in synchronization with sending of message 3 in a 4-way handshake procedure or message 1 in a group key handshake procedure, and a terminal-side transmitting/receiving section 110 that transmits information from the control section.

By this means, encryption key information can be transmitted in synchronization with message transmission in an IEEE802.11i standard or WPA standard 4-way handshake procedure or group key handshake procedure immediately after encryption key information is generated in Access controller 100. Therefore the message and the encryption key information are acquired simultaneously as a calculation material for a Key MIC that is overwritten when the message is sent to communication terminal 300 in wireless LAN base station apparatus 200. Thus, wireless LAN base station apparatus 200 can receive a message and encryption key information, and transmit a message to which an immediately calculated Key MIC has been added to communication terminal 300, enabling the time taken for a 4-way handshake procedure to be reduced.

The above-described control section in Access controller 100 is provided with encryption key encapsulation section 130 that forms one frame including message 3 and encryption key information in an IEEE802.11i standard or WPA standard 4-way handshake procedure, and provides for the formed frame to be sent.

By this means, by performing inclusive transmission in the same frame, the number of frames transmitted between wireless LAN base station apparatus 200 and communication terminal 300 is decreased, and traffic in the system can be reduced.

The above-described control section (comprising authentication processing section 120 and encryption key encapsulation section 130) sends existing GTK use information indicating whether an existing GTK is to be sent or a newly created GTK is to be sent as a GTK serving as encryption key information with encryption key information in synchronization with a message in a 4-way handshake procedure.

Also, when the GTK use information indicates a new GTK, the above-described control section (comprising authentication processing section 120 and encryption key encapsulation section 130) further sends a Key MIC which is calculated based on a PTK serving as the encryption key information and the GTK use information and included in an EAPoL-Key frame as a message in the IEEE802.11i standard or WPA standard 4-way handshake procedure.

According to Embodiment 1, wireless LAN base station apparatus 200 is provided with a key management table 250 that temporarily stores received encryption key information, and a control section (comprising frame processing section 220, MIC calculation section 240, and key configuration section 230) that applies temporarily stored encryption key information to communication with communication terminal 300, taking message 4 in a 4-way handshake procedure or message 2 in a group key handshake procedure as a trigger.

By this means, encryption key configuration in wireless LAN base station apparatus 200 can be performed while maintaining synchronization with encryption key information setting in communication terminal 300, enabling a transition to encrypted communication between wireless LAN base station apparatus 200 and communication terminal 300 to be performed rapidly.

According to Embodiment 1, wireless LAN base station apparatus 200 is provided with a network-side transmitting/receiving section 210 that receives encryption key information, GTK use information, and an EAPoL-Key frame, and a control section (comprising frame processing section 220, MIC calculation section 240, and key configuration section 230) that controls transfer of the EAPoL-Key frame to communication terminal 300; and the control section, when the received GTK use information indicates an existing GTK, includes a GTK count value counting the number of times a frame encrypted by means of an existing GTK as the encryption key information has been transmitted to another communication terminal in the EAPoL-Key frame, and when the received GTK use information indicates a new GTK, sets the GTK count value to 0 and includes it in the EAPoL-Key frame, and furthermore calculates a Key MIC value based on the EAPoL-Key frame in which the GTK counter value is included and a PTK as encryption key information, and transmits the EAPoL-Key frame including that Key MIC.

Also, wireless LAN base station apparatus 200 is provided with a network-side transmitting/receiving section 210 that receives encryption key information, GTK use information, and an EAPoL-Key frame, and a control section (comprising frame processing section 220, MIC calculation section 240, and key configuration section 230) that controls transfer of the EAPoL-Key frame to a communication terminal; and the control section, when the received GTK use information indicates an existing GTK, includes a GTK count value counting the number of times a frame encrypted by means of an existing GTK as the encryption key information has been transmitted to another communication terminal in the EAPoL-Key frame, calculates a Key MIC based on the EAPoL-Key frame in which that GTK counter value is included and a PTK as the encryption key information, and transmits the EAPoL-Key frame further including that Key MIC, and when the received GTK use information indicates a new GTK, transfers the EAPoL-Key frame without modification.

Embodiment 2

A communication system of Embodiment 2 has communication terminates, wireless LAN base station apparatuses, and an Access controller, as in Embodiment 1, but differs from communication system 10 as regards the operation when an EAPoL-Key frame (message 4) of a 4-way handshake procedure stipulated in IEEE802.11i is transmitted, and when an EAPoL-Key frame (message 2) of a group key handshake procedure stipulated in IEEE802.11i is transmitted.

Figure 6:
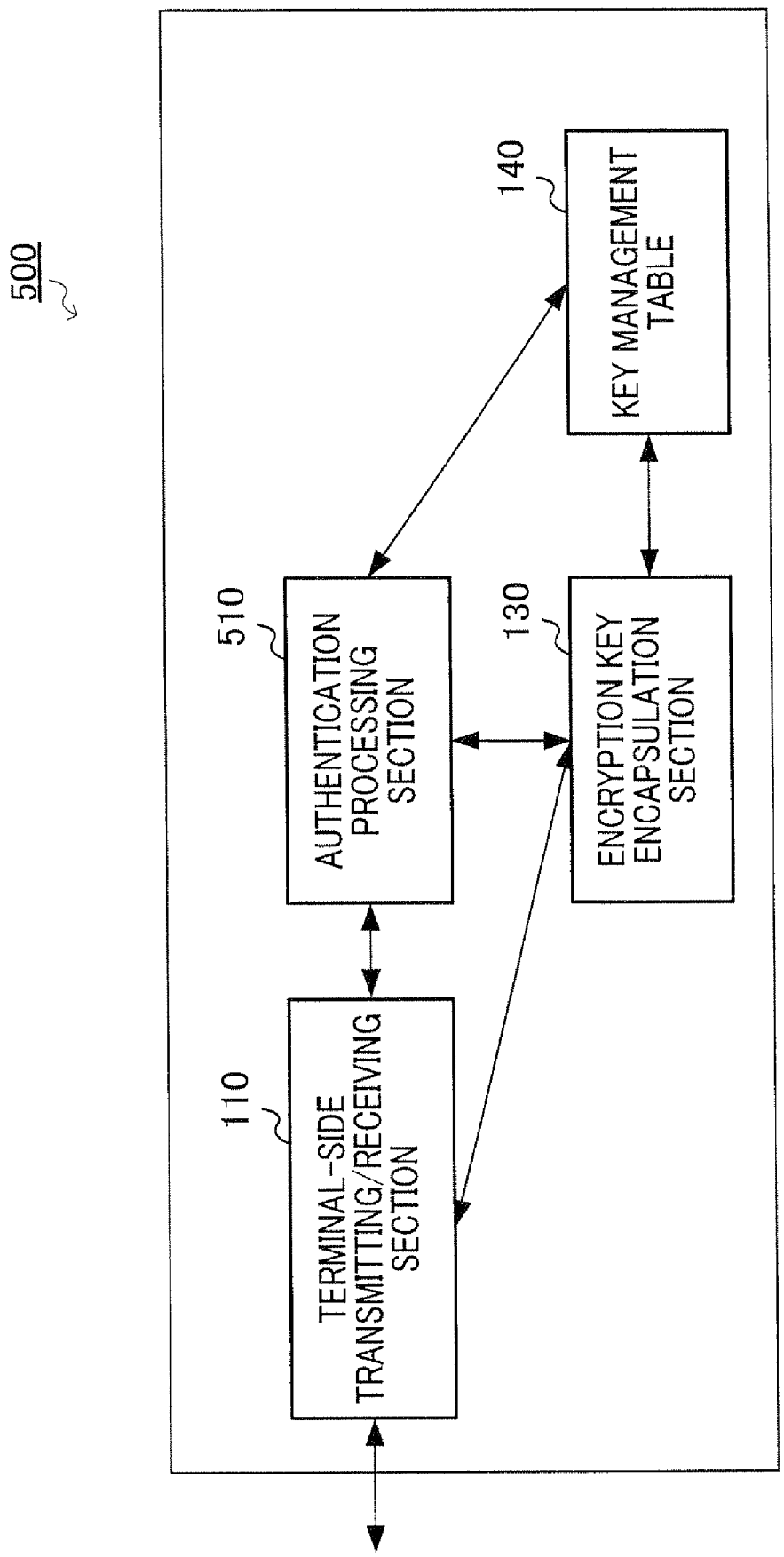
FIG. 6 is a block diagram showing the configuration of an Access controller according to Embodiment 2.

As shown in FIG. 6, an Access controller 500 of Embodiment 2 has an authentication processing section 510. This authentication processing section 510 basically performs the same kind of operations as authentication processing section 120 of Access controller 100, but the operation differs when an EAPoL-Key frame (message 4) of a 4-way handshake procedure stipulated in IEEE802.11i is received, and when an EAPoL-Key frame (message 2) of a group key handshake procedure stipulated in IEEE802.11i is received. Specifically, when the above EAPoL-Key frames are received in the two procedures, authentication processing section 510 generates a key installation request frame, and performs transmission processing for this key installation request frame.

Figure 7:
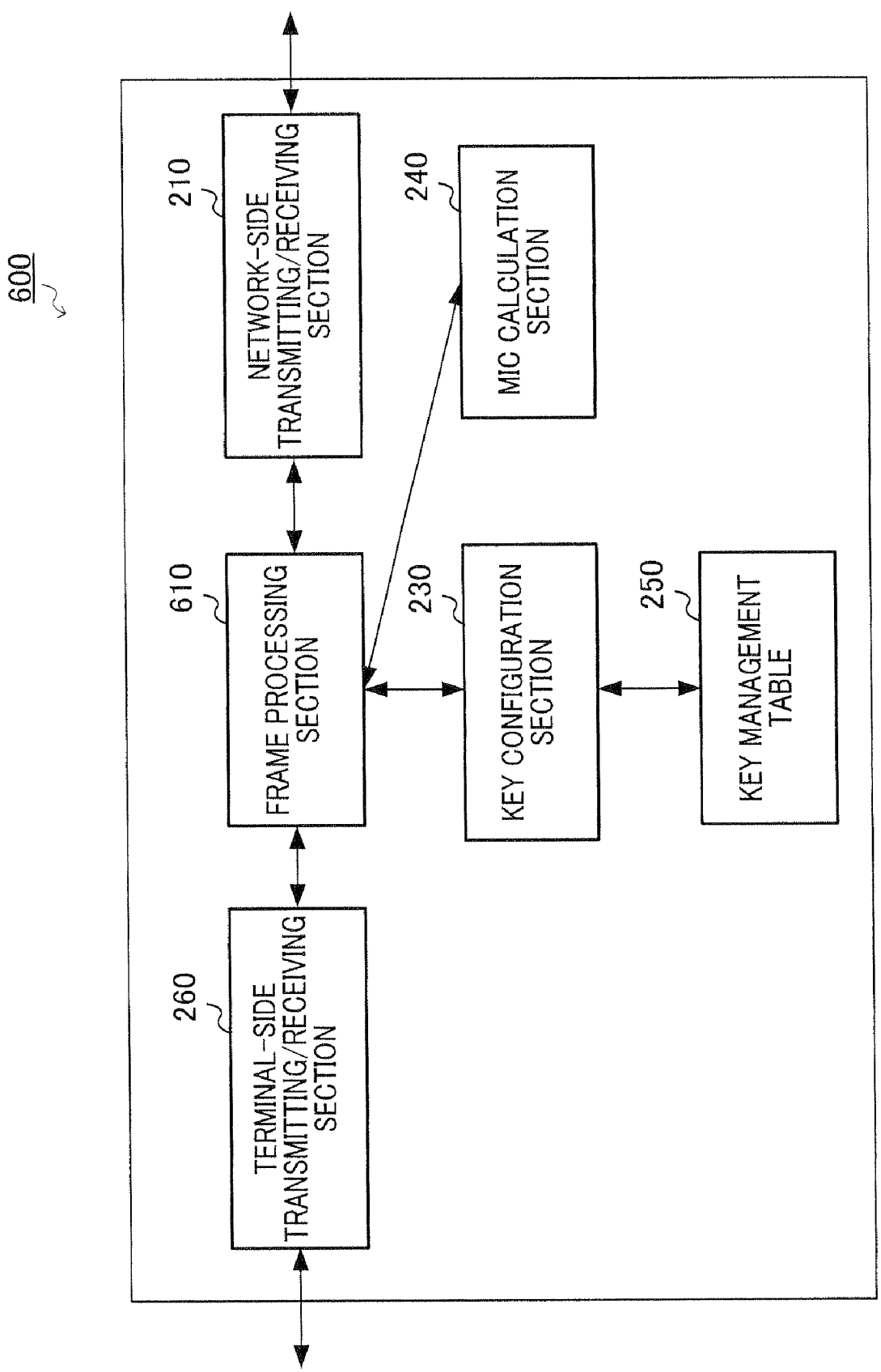
FIG. 7 is a block diagram showing the configuration of a wireless LAN base station apparatus according to Embodiment 2.

As shown in FIG. 7, a wireless LAN base station apparatus 600 of Embodiment 2 has a frame processing section 610. This frame processing section 610 basically performs the same kind of operations as frame processing section 220 of wireless LAN base station apparatus 200, but the operation differs when an EAPoL-Key frame (message 4) of a 4-way handshake procedure stipulated in IEEE802.11i is received, and when an EAPoL-Key frame (message 2) of a group key handshake procedure stipulated in IEEE802.11i is received, for instance. Specifically, frame processing section 610—unlike Embodiment 1—does not perform key installation control when the above EAPoL-Key frames are received in the two procedures, but performs key installation control upon input of a key installation request frame transmitted from Access controller 500.

Next, the operation of a communication system of Embodiment 2 having the above configuration will be described.

Figure 8:
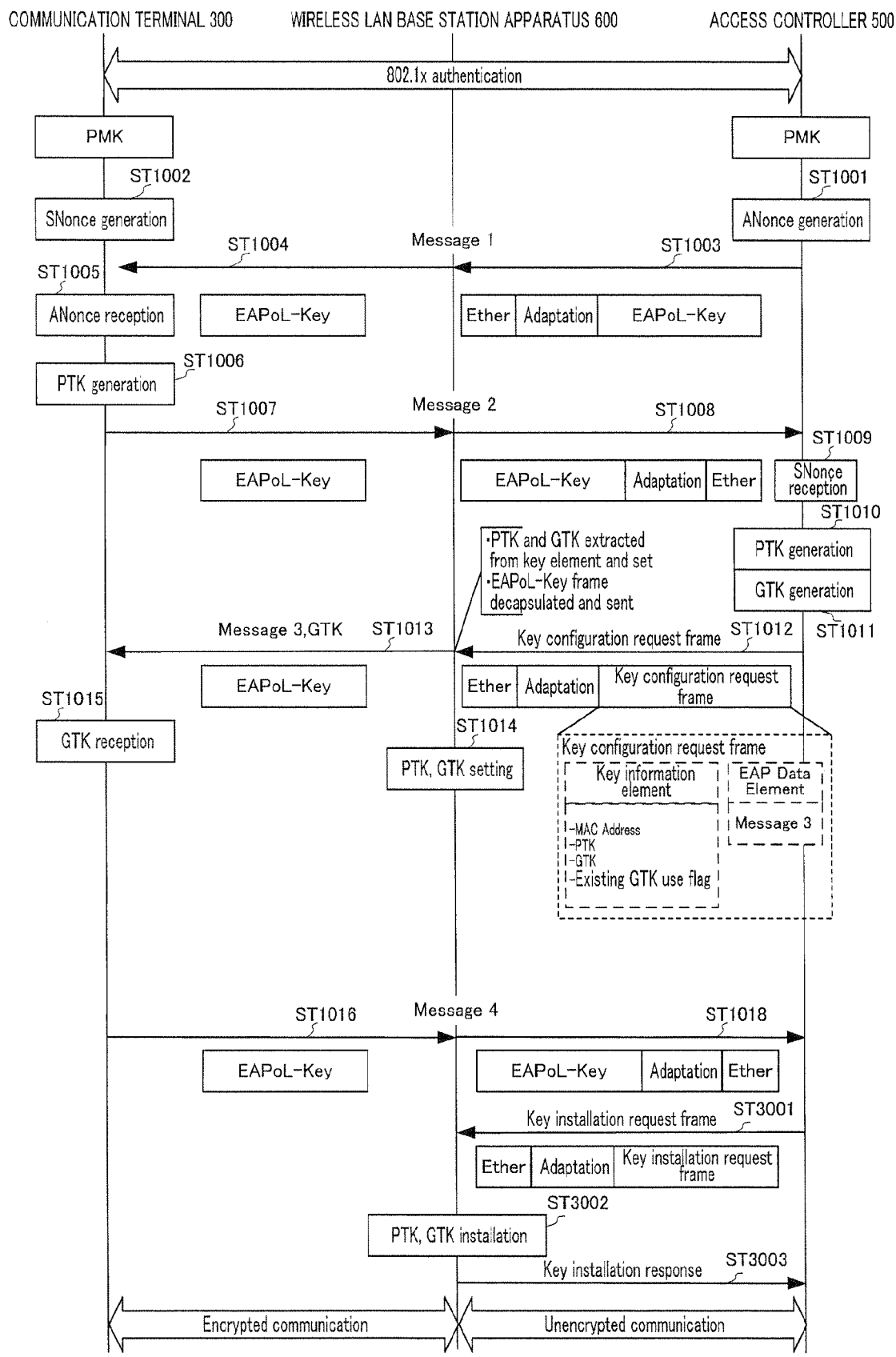
FIG. 8 is a chart explaining the operation of a communication system having the Access controller in FIG. 6 and the wireless LAN base station apparatus in FIG. 7.

FIG. 8 shows the operation of the 4-way handshake procedure stipulated in IEEE802.11i in a communication system of Embodiment 2.

Communication terminal 300 transmits an EAPoL-Key frame (message 4) to wireless LAN base station apparatus 600 (step ST1016).

On receiving the EAPoL-Key frame (message 4) from communication terminal 300, wireless LAN base station apparatus 600—unlike wireless LAN base station apparatus 200—does not perform PTK and GTK installation processing, but adds a predetermined header to the EAPoL-Key frame (message 4) and transmits that EAPoL-Key frame (message 4) to Access controller 500. Specifically, terminal-side transmitting/receiving section 260 receives the above-described EAPoL-Key frame (message 4) transmitted from communication terminal 300, and outputs this EAPoL-Key frame (message 4) to frame processing section 610. Then, when the EAPoL-Key frame (message 4) is input, frame processing section 610 adds a predetermined header but does not output an installation request to key configuration section 230. Then frame processing section 610 transmits the EAPoL-Key frame (message 4) to which this header has been added to Access controller 500 via network-side transmitting/receiving section 210 (step ST1018).

In Access controller 500, terminal-side transmitting/receiving section 110 receives the above-described EAPoL-Key frame (message 4) transmitted from wireless LAN base station apparatus 600, and outputs this EAPoL-Key frame (message 4) to authentication processing section 510. When the EAPoL-Key frame (message 4) is input, authentication processing section 510 generates a key installation request frame and adds a predetermined header. Then authentication processing section 510 transmits the generated key installation request frame to wireless LAN base station apparatus 600 via terminal-side transmitting/receiving section 110 (step ST3001).

On receiving the key installation request frame from Access controller 500, wireless LAN base station apparatus 600 performs installation processing for the PTK and GTK set in step ST1014 (step ST3002). Specifically, network-side transmitting/receiving section 210 receives the key installation request frame and outputs this key installation request frame to frame processing section 610. Then, when the key installation request frame is input, frame processing section 610 outputs an installation request to key configuration section 230. Key configuration section 230 then performs PTK and GTK installation processing corresponding to the installation request from frame processing section 610. By this means, a state is established in which it is possible to use the PTK and GTK used in actual encryption/decryption processing between communication terminal 300 and wireless LAN base station apparatus 600. That is to say, encrypted communication becomes possible between communication terminal 300 and wireless LAN base station apparatus 600.

Frame processing section 610 then generates a key installation response frame in response to the key installation request frame, and transmits this to Access controller 500 via network-side transmitting/receiving section 210 (step ST3003).

Figure 9:
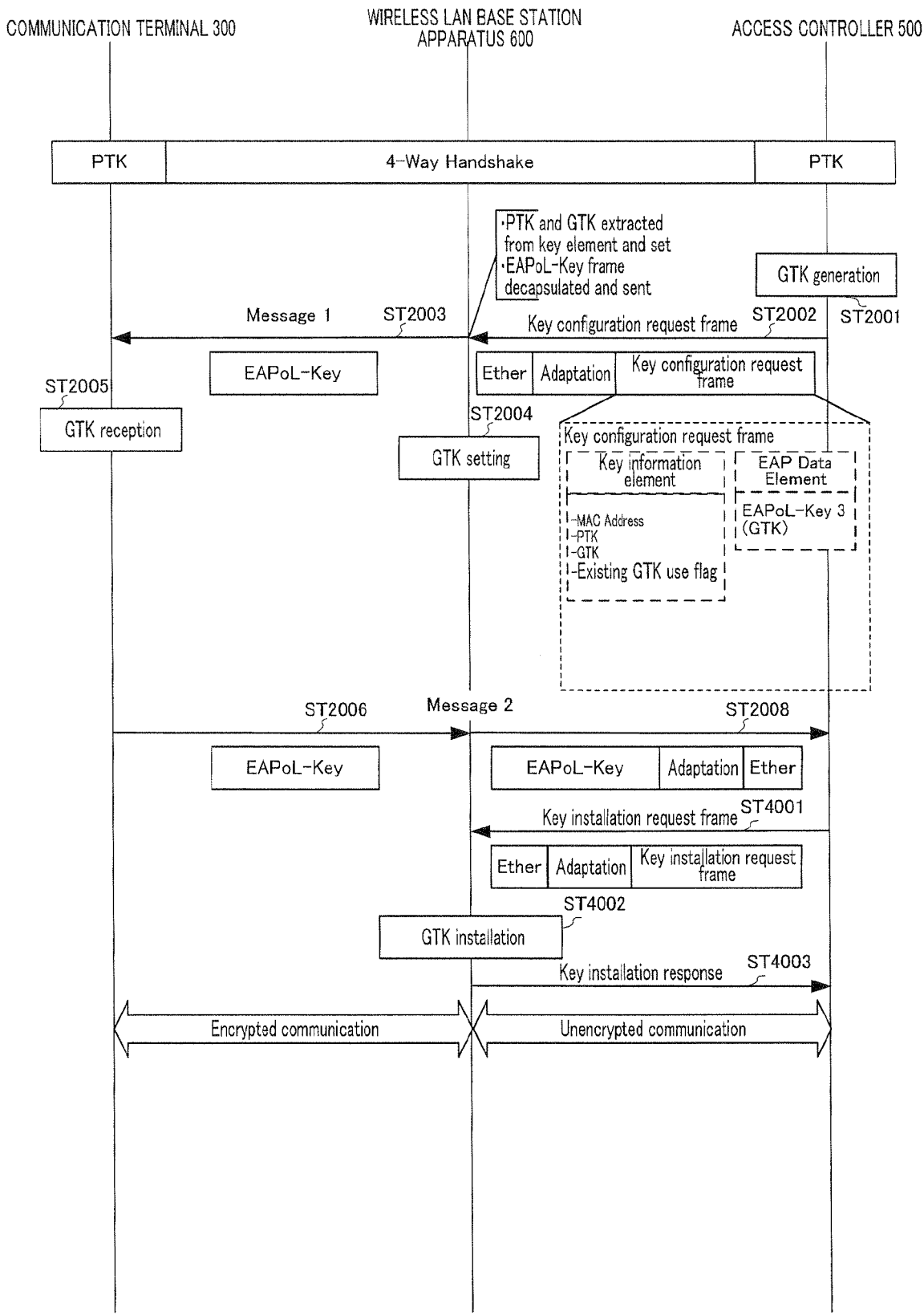
FIG. 9 is another chart explaining the operation of a communication system having the Access controller in FIG. 6 and the wireless LAN base station apparatus in FIG. 7.

FIG. 9 shows the operation of the group key handshake procedure stipulated in IEEE802.11i in a communication system of Embodiment 2.

Communication terminal 300 transmits a group key handshake procedure EAPoL-Key frame (message 2) to wireless LAN base station apparatus 600 (step ST2006).

On receiving the group key handshake procedure EAPoL-Key frame (message 2) from communication terminal 300, wireless LAN base station apparatus 600—unlike wireless LAN base station apparatus 200—does not perform GTK installation processing, but only adds a predetermined header to the EAPoL-Key frame (message 2) and transmits that EAPoL-Key frame (message 2) to Access controller 500. Specifically, terminal-side transmitting/receiving section 260 receives the above-described EAPoL-Key frame (message 2) transmitted from communication terminal 300, and outputs this EAPoL-Key frame (message 2) to frame processing section 610. Then, when the EAPoL-Key frame (message 2) is input, frame processing section 610 adds a predetermined header but does not output an installation request to key configuration section 230. Frame processing section 610 then transmits the EAPoL-Key frame (message 2) to which this header has been added to Access controller 500 via network-side transmitting/receiving section 210 (step ST2008).

In Access controller 500, terminal-side transmitting/receiving section 110 receives the above-described EAPoL-Key frame (message 2) transmitted from wireless LAN base station apparatus 600, and outputs this EAPoL-Key frame (message 2) to authentication processing section 510. When the EAPoL-Key frame (message 2) is input, authentication processing section 510 generates a key installation request frame and adds a predetermined header. Authentication processing section 510 then transmits the generated key installation request frame to wireless LAN base station apparatus 600 via terminal-side transmitting/receiving section 110 (step ST4001).

On receiving the key installation request frame from Access controller 500, wireless LAN base station apparatus 600 performs installation processing for the GTK (GTK after updating) set in step ST2004 (step ST4002). Specifically, network-side transmitting/receiving section 210 receives the key installation request frame, and outputs this key installation request frame to frame processing section 610. When the key installation request frame is input, frame processing section 610 outputs an installation request to key configuration section 230. Key configuration section 230 then performs GTK installation processing corresponding to the installation request from frame processing section 610. By this means, a state is established in which it is possible to use the GTK (GTK after updating) used in actual encryption/decryption processing between communication terminal 300 and wireless LAN base station apparatus 600. That is to say, encrypted communication becomes possible between communication terminal 300 and wireless LAN base station apparatus 600.

Frame processing section 610 then generates a key installation response frame in response to the key installation request frame, and transmits this to Access controller 500 via network-side transmitting/receiving section 210 (step ST4003).

Thus, according to Embodiment 2, Access controller 500 is provided with a control section (comprising authentication processing section 510 and encryption key encapsulation section 130) that generates encryption key information (PTK, GTK) and transmits that encryption key information (PTK, GTK) in synchronization with sending of an 802.11i standard or WPA standard 4-way handshake procedure message 3 or group key handshake procedure message 1, and a terminal-side transmitting/receiving section 110 that transmits information from the control section.

Upon termination of a 4-way handshake procedure or group key handshake procedure (that is, in response to message 4 in a 4-way handshake procedure or message 2 in a group key handshake procedure), the above-described control section sends control information (a key configuration request frame) as a trigger for applying encryption key information transmitted to wireless LAN base station apparatus 600 to communication with communication terminal 300.

As a result, wireless LAN base station apparatus 600 no longer needs to use a message as an encryption key information application trigger, and therefore the need to monitor messages in wireless LAN base station apparatus 600 is eliminated, enabling resource savings to be achieved in wireless LAN base station apparatus 600.

Also, according to Embodiment 2, wireless LAN base station apparatus 600 is provided with a key management table 250 that temporarily stores received encryption key information, and a control section (comprising frame processing section 610, MIC calculation section 240, and key configuration section 230) that applies the temporarily stored encryption key information to communication with the communication terminal based on control information (a key configuration request frame) transmitted from Access controller 500.

As a result, wireless LAN base station apparatus 600 no longer needs to use a message as an encryption key information application trigger, and therefore the need to monitor messages in wireless LAN base station apparatus 600 is eliminated, enabling resource savings to be achieved in wireless LAN base station apparatus 600.

Embodiment 3

A communication system of Embodiment 3 has communication terminates, wireless LAN base station apparatuses, and an Access controller, as in Embodiment 1, but differs from communication system 10 as regards the operation when an EAPoL-Key frame (message 2, message 3, or message 4) of a 4-way handshake procedure stipulated in IEEE802.11i is transmitted, and when an EAPoL-Key frame (message 1 or message 2) of a group key handshake procedure stipulated in IEEE802.11i is transmitted. Specifically, whereas in Embodiment 1 a Key MIC is calculated by wireless LAN base station apparatus 200 when an existing GTK is used, in this embodiment Key MIC calculation is performed by the Access controller. Therefore, in a wireless LAN base station apparatus, the current GTK counter value is also included when an uplink (wireless LAN base station apparatus to Access controller) message is transmitted.

Figure 10:
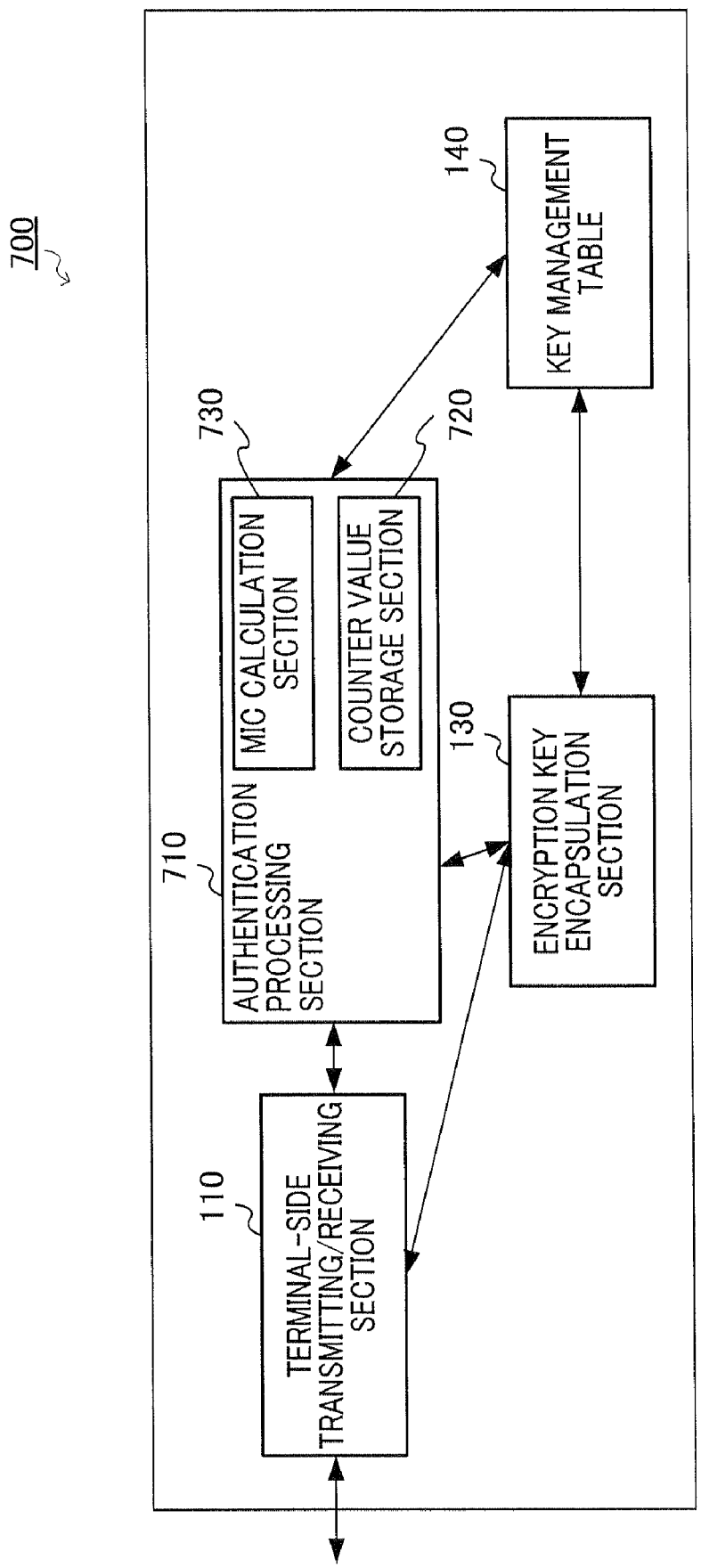
FIG. 10 is a block diagram showing the configuration of an Access controller according to Embodiment 3.

As shown in FIG. 10, an Access controller 700 of Embodiment 3 has an authentication processing section 710, a counter value storage section 720, and an MIC calculation section 730.

Figure 11:
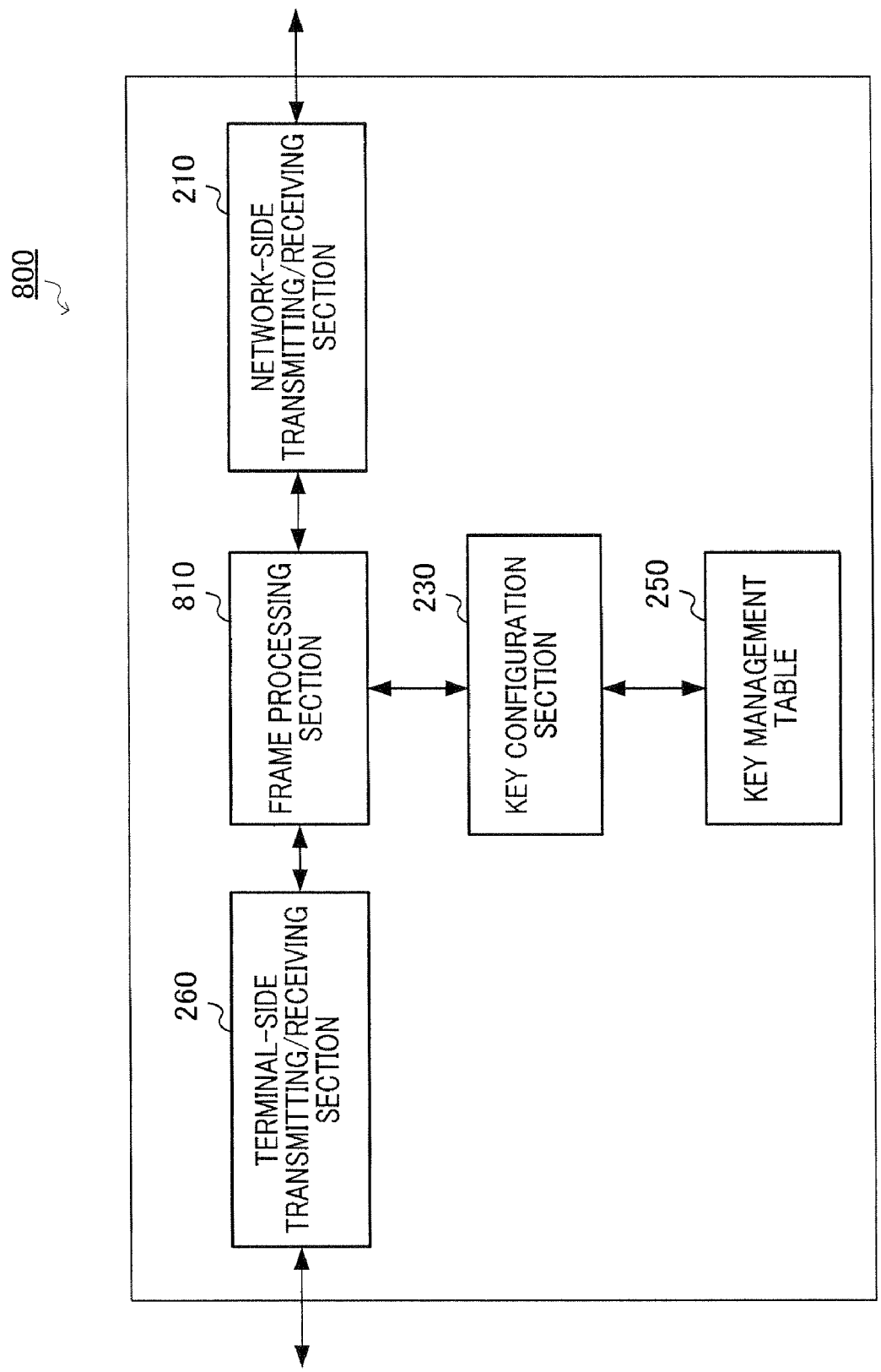
FIG. 11 is a block diagram showing the configuration of a wireless LAN base station apparatus according to Embodiment 3.

As shown in FIG. 11, a wireless LAN base station apparatus 800 of Embodiment 3 has a frame processing section 810.

Next, the operation of a communication system of Embodiment 3 having the above configuration will be described.

Figure 12:
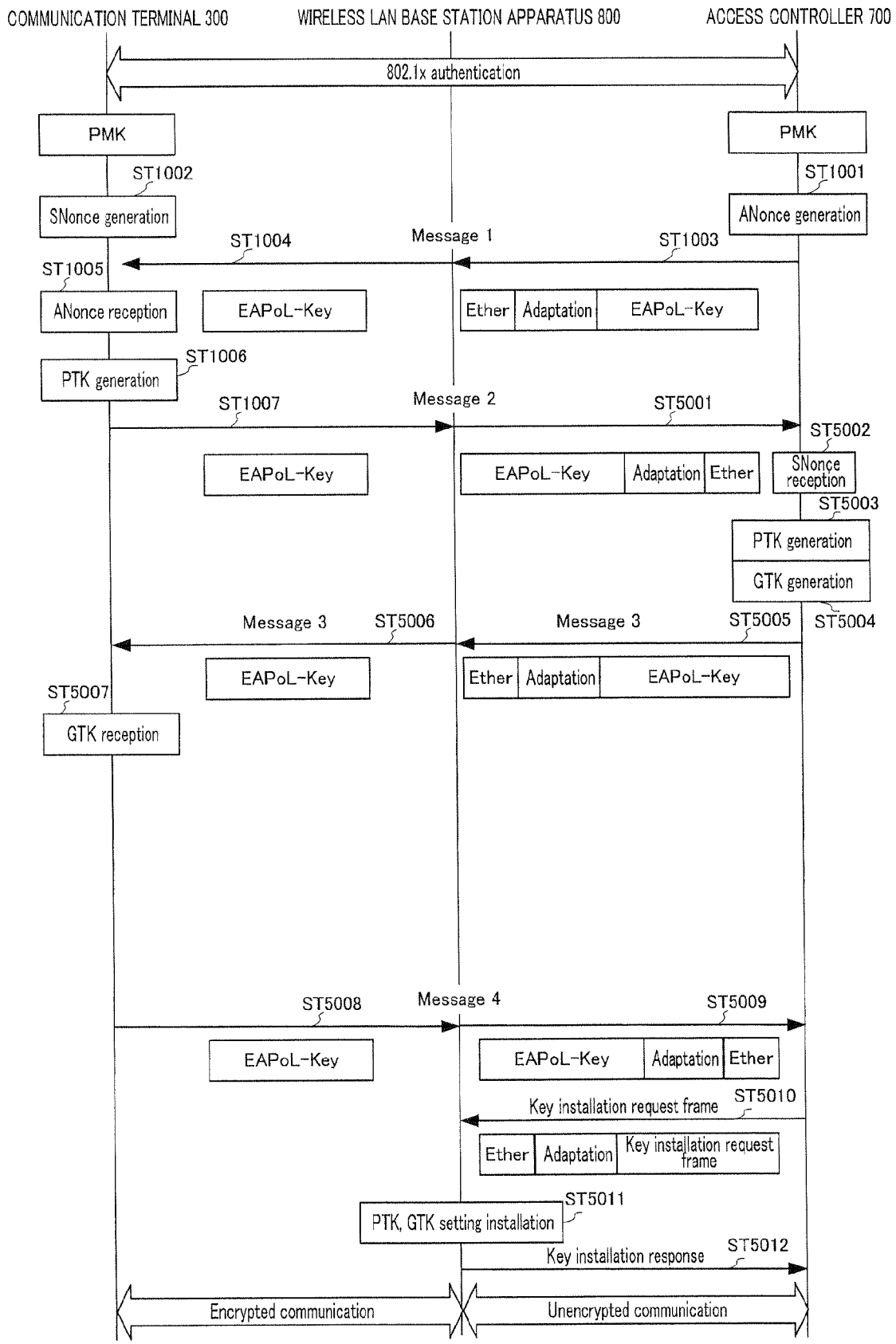
FIG. 12 is a chart explaining the operation of a communication system having the Access controller in FIG. 10 and the wireless LAN base station apparatus in FIG. 11.

FIG. 12 shows the operation of the 4-way handshake procedure stipulated in IEEE802.11i in a communication system of Embodiment 3.

Communication terminal 300 calculates a Key MIC using an EAPoL-Key KCK included in a generated PTK. Then communication terminal 300 provides the calculated Key MIC to an EAPoL-Key frame (message 2) including an SNonce, and transmits this EAPoL-Key frame (message 2) to wireless LAN base station apparatus 800 (step ST1007).

In wireless LAN base station apparatus 800, terminal-side transmitting/receiving section 260 receives the above-described EAPoL-Key frame (message 2) transmitted from communication terminal 300, and outputs this EAPoL-Key frame (message 2) to frame processing section 810. Then, when the EAPoL-Key frame (message 2) is input, frame processing section 810 adds the GTK counter value currently held by wireless LAN base station apparatus 800 to an adaptation header, and also adds a predetermined header (here, an Ether header), and transmits the EAPoL-Key frame (message 2) to Access controller 700 via network-side transmitting/receiving section 210 (step ST5001). As explained above, the GTK counter value is a sequence counter value that is incremented when a wireless LAN base station apparatus sends a frame encrypted by means of a GTK, equivalents being TSC in the case of TKIP, and PN in the case of CCMP.

In Access controller 700, reception processing is performed for the SNonce included in the EAPoL-Key frame (message 2) (step ST5002). Then Access controller 700 stores the GTK counter value included in the EAPoL-Key frame (message 2). Specifically, authentication processing section 710 receives the EAPoL-Key frame (message 2) via terminal-side transmitting/receiving section 110, and stores the GTK counter value included in the EAPoL-Key frame (message 2) in counter value storage section 720.

Then, in step ST5003, Access controller 700 generates a PTK (Pairwise Transient Key) based on the PMK, ANonce, and SNonce. Here, it is assumed that Access controller 700 and communication terminal 300 share a PTK generated based on the PMK, ANonce, and SNonce using the same pseudorandom function.

In step ST5004, Access controller 700 generates a GTK (Group Temporal Key) by means of a predetermined method.

Then, in Access controller 700, authentication processing section 710 performs predetermined processing according to whether a GTK already transmitted to another communication terminal 300, or a newly created GTK, is to be used as the GTK to be distributed to communication terminal 300.

Specifically, if a GTK already transmitted to another communication terminal 300 is to be used, authentication processing section 710 generates an EAPoL-Key frame (message 3) with the GTK counter value stored in counter value storage section 720 as a Key RSC. Then authentication processing section 710 provides this EAPoL-Key frame (message 3) and the PTK generated in step ST5003 to MIC calculation section 730 and causes Key MIC to be calculated here, and overwrites the Key MIC area of the EAPoL-Key frame (message 3) with the calculated Key MIC. Authentication processing section 710 also includes the GTK in this EAPoL-Key frame (message 3).

On the other hand, if a newly created GTK is to be used, authentication processing section 710 does not use the GTK counter value stored in counter value storage section 720, sets the Key RSC to 0, and generates an EAPoL-Key frame (message 3) including the GTK to be used.

Then the EAPoL-Key frame (message 3) generated by authentication processing section 710 has a predetermined header (here, an Ether header) added, and is transmitted to wireless LAN base station apparatus 800 (step ST5005).

In wireless LAN base station apparatus 800, network-side transmitting/receiving section 210 receives the above-described EAPoL-Key frame (message 3) transmitted from Access controller 700, and outputs this EAPoL-Key frame (message 3) to frame processing section 810. Then, when the EAPoL-Key frame (message 3) is input, frame processing section 810 performs decapsulation—that is, removes the Ether header and adaptation—and transmits the EAPoL-Key frame (message 3) to communication terminal 300 via terminal-side transmitting/receiving section 260 (step ST5006).

In communication terminal 300, the EAPoL-Key frame (message 3) transmitted from wireless LAN base station apparatus 800 is received, and GTK reception processing is performed (step ST5007). Then communication terminal 300 transmits an EAPoL-Key frame (message 4) to wireless LAN base station apparatus 800 (step ST5008).

In wireless LAN base station apparatus 800, terminal-side transmitting/receiving section 260 receives the EAPoL-Key frame (message 4) transmitted from communication terminal 300, and outputs this EAPoL-Key frame (message 4) to frame processing section 810. When the EAPoL-Key frame (message 4) is input, frame processing section 810 adds the GTK counter value currently held by wireless LAN base station apparatus 800 to the adaptation header, and also adds a predetermined header (here, an Ether header) and transmits the EAPoL-Key frame (message 4) to Access controller 700 via network-side transmitting/receiving section 210 (step ST5009).

In Access controller 700, terminal-side transmitting/receiving section 110 receives the EAPoL-Key frame (message 4) transmitted from wireless LAN base station apparatus 800, and outputs this EAPoL-Key frame (message 4) to authentication processing section 710. Then authentication processing section 710 overwrites counter value storage section 720 with the GTK counter value included in the EAPoL-Key frame (message 4). Also, when the EAPoL-Key frame (message 4) is input, authentication processing section 710 generates a key installation request frame and adds a predetermined header. Specifically, authentication processing section 710 generates a key installation request frame including the PTK and GTK generated in step ST5003 and step ST5004 and the terminal MAC address. Then authentication processing section 710 adds a predetermined header (here, an Ether header) to this key installation request frame, and transmits the key installation request frame to wireless LAN base station apparatus 800 via terminal-side transmitting/receiving section 110 (step ST5010).

On receiving the key installation request frame from Access controller 700, wireless LAN base station apparatus 800 performs setting and installation of the PTK and GTK included in this key installation request frame (step ST5011). Specifically, network-side transmitting/receiving section 210 receives the key installation request frame, and outputs this key installation request frame to frame processing section 810. Then, when the key installation request frame is input, frame processing section 810 outputs the PTK and GTK, and an installation request, to key configuration section 230. Key configuration section 230 sets the PTK and GTK in key management table 250, and also performs PTK and GTK installation processing. By this means, a state is established in which it is possible to use the PTK and GTK (GTK after updating) used in actual encryption/decryption processing between communication terminal 300 and wireless LAN base station apparatus 800.

Frame processing section 810 then generates a key installation response frame in response to the key installation request frame, and transmits this to Access controller 700 via network-side transmitting/receiving section 210 (step ST5012).

In the WPA-specification 4-way handshake procedure a GTK is not sent in message 3, and therefore authentication processing section 710 does not use a GTK counter value stored in memory 702, but creates a Key MIC based on a frame for which the Key RSC has been set to 0, and generates an EAPoL-Key frame (message 3) using that Key MIC.

Figure 13:
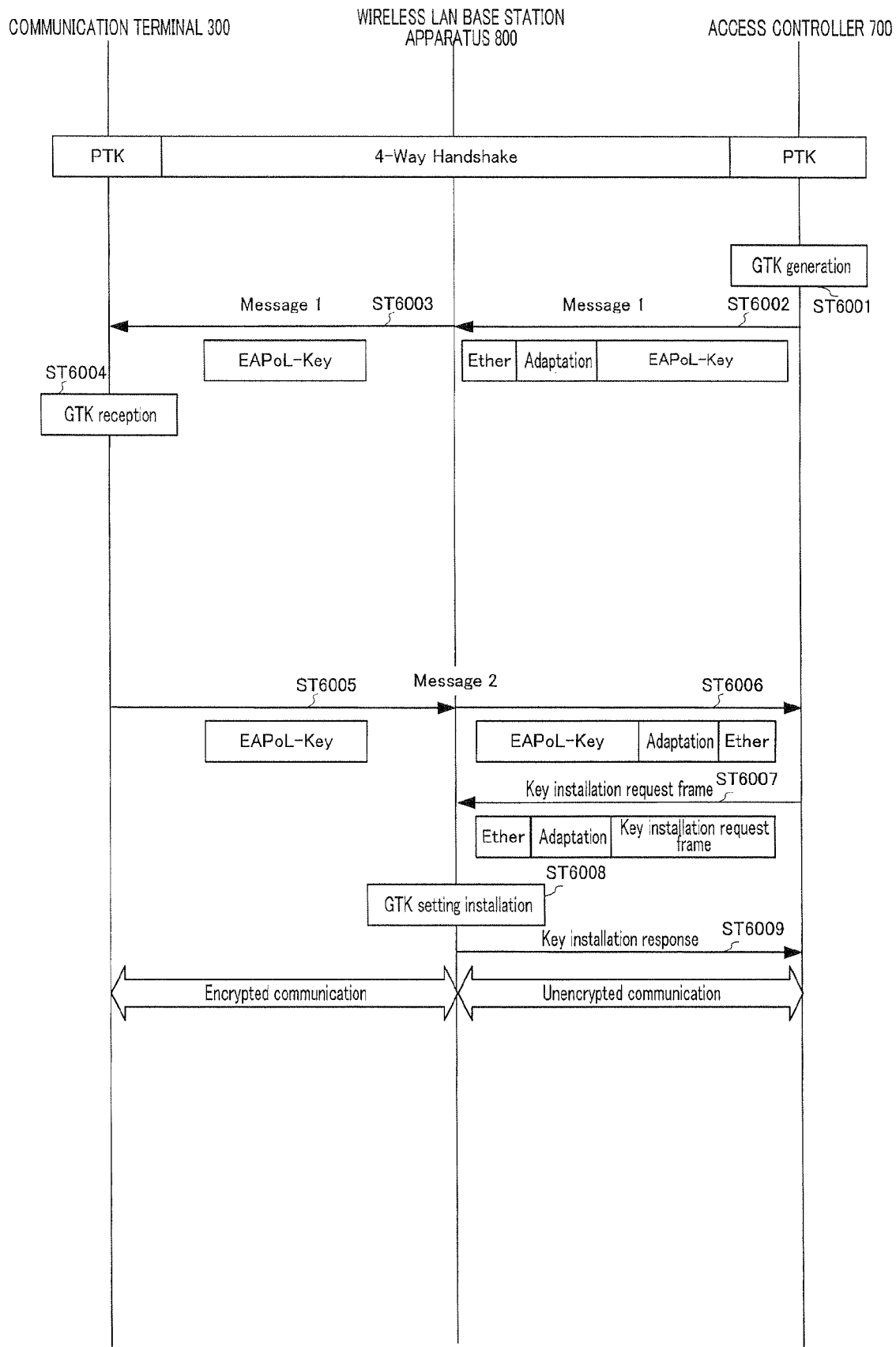
FIG. 13 is another chart explaining the operation of a communication system having the Access controller in FIG. 10 and the wireless LAN base station apparatus in FIG. 11.

FIG. 13 shows the operation of the group key handshake procedure stipulated in IEEE802.11i in a communication system of Embodiment 3.

Access controller 700 and communication terminal 300 share a PTK and GTK by means of the 4-way handshake procedure stipulated in IEEE802.11i. It is here assumed that GTK updating is necessary for the same reason as described above.

In step ST6001, Access controller 700 prepares a GTK to be updated. At this time, authentication processing section 710 in Access controller 700 performs predetermined processing according to whether a GTK already transmitted to another communication terminal 300, or a newly created GTK, is to be used as the GTK to be distributed to communication terminal 300.

Specifically, if a GTK already transmitted to another communication terminal 300 is to be used, authentication processing section 710 generates an EAPoL-Key frame (message 1) with the GTK counter value stored in counter value storage section 720 (the GTK counter value included in 4-way handshake procedure message 4, or, when a group key handshake procedure is performed after the 4-way handshake procedure, the GTK counter value included in message 2 of the most recently performed group key handshake procedure) as a Key RSC. Authentication processing section 710 also includes the GTK in this EAPoL-Key frame (message 1). Then authentication processing section 710 provides this EAPoL-Key frame (message 1) and the PTK to MIC calculation section 730 and causes Key MIC to be calculated here, and overwrites the Key MIC area of the EAPoL-Key frame (message 1) with the calculated Key MIC.

On the other hand, if a newly created GTK is to be used, authentication processing section 710 does not use the GTK counter value stored in counter value storage section 720, sets the Key RSC to 0 and performs the same kind of Key MIC calculation, and generates an EAPoL-Key frame (message 1) including the GTK to be used.

Then the EAPoL-Key frame (message 1) generated by authentication processing section 710 has a predetermined header (here, an Ether header) added, and is transmitted to wireless LAN base station apparatus 800 (step ST6002).

In wireless LAN base station apparatus 800, network-side transmitting/receiving section 210 receives the above-described EAPoL-Key frame (message 1) transmitted from Access controller 700, and outputs this EAPoL-Key frame (message 1) to frame processing section 810. Then, when the EAPoL-Key frame (message 1) is input, frame processing section 810 performs decapsulation—that is, removes the Ether header and adaptation—and transmits the EAPoL-Key frame (message 1) and GTK to communication terminal 300 via terminal-side transmitting/receiving section 260 (step ST6003).

In communication terminal 300, the EAPoL-Key frame (message 1) transmitted from wireless LAN base station apparatus 800 is received, and GTK reception processing is performed (step ST6004). Then communication terminal 300 transmits an EAPoL-Key frame (message 2) to wireless LAN base station apparatus 800 (step ST6005).

In wireless LAN base station apparatus 800, terminal-side transmitting/receiving section 260 receives the EAPoL-Key frame (message 2) transmitted from communication terminal 300, and outputs this EAPoL-Key frame (message 2) to frame processing section 810. When the EAPoL-Key frame (message 2) is input, frame processing section 810 adds the GTK counter value currently held by wireless LAN base station apparatus 800 to the adaptation header, and also adds a predetermined header (here, an Ether header) and transmits the EAPoL-Key frame (message 2) to Access controller 700 via network-side transmitting/receiving section 210 (step ST6006).

In Access controller 700, terminal-side transmitting/receiving section 110 receives the EAPoL-Key frame (message 2) transmitted from wireless LAN base station apparatus 800, and outputs this EAPoL-Key frame (message 2) to authentication processing section 710. Then authentication processing section 710 overwrites counter value storage section 720 with the GTK counter value included in the EAPoL-Key frame (message 2). Also, when the EAPoL-Key frame (message 2) is input, authentication processing section 710 generates a key installation request frame and adds a predetermined header. Specifically, authentication processing section 710 generates a key installation request frame including the GTK prepared in step ST6001 and the terminal MAC address. Then authentication processing section 710 adds a predetermined header (here, an Ether header) to this key installation request frame, and transmits the key installation request frame to wireless LAN base station apparatus 800 via terminal-side transmitting/receiving section 110 (step ST6007).

On receiving the key installation request frame from Access controller 700, wireless LAN base station apparatus 800 performs setting and installation of the GTK included in this key installation request frame (step ST6008). Specifically, network-side transmitting/receiving section 210 receives the key installation request frame, and outputs this key installation request frame to frame processing section 810. Then, when the key installation request frame is input, frame processing section 810 outputs the GTK and an installation request to key configuration section 230. Key configuration section 230 sets the GTK in key management table 250, and also performs GTK installation processing. By this means, a state is established in which it is possible to use the GTK (GTK after updating) used in actual encryption/decryption processing between communication terminal 300 and wireless LAN base station apparatus 800.

Frame processing section 810 then generates a key installation response frame in response to the key installation request frame, and transmits this to Access controller 700 via network-side transmitting/receiving section 210 (step ST6009).

In the above description, encryption key encapsulation section 130 does not operate in step ST5004 through step ST5005 or step ST6001 through step ST6002 since a GTK is included in an EAPoL-Key frame (message 3) or EAPoL-Key frame (message 1) generated by authentication processing section 710. However, this is not a limitation, and the following procedure may also be used. Namely, authentication processing section 710 generates an EAPoL-Key frame (message 3) and EAPoL-Key frame (message 1), but does not include a GTK therein, and sends the EAPoL-Key frame (message 3), EAPoL-Key frame (message 1), and GTK to encryption key encapsulation section 130, after which encryption key encapsulation section 130 integrates the EAPoL-Key frame (message 3), EAPoL-Key frame (message 1), and GTK into a single frame, and transmits this frame to wireless LAN base station apparatus 800.

In the above description, a GTK counter value is inserted into an adaptation header, but the counter value alone may be sent to Access controller 700 in a separate frame after 4-way handshake message 2 and message 4 are transmitted by wireless LAN base station apparatus 800. That is to say, Access controller 700 only needs to be able to perform synchronized storage of a GTK counter value held at an access point at the time of 4-way handshake message 3 transmission or Group-Key handshake message 1 transmission.

Thus, according to Embodiment 3, Access controller 700 is provided with an authentication processing section 710 serving as a control section that generates encryption key information (PTK, GTK) and transmits that encryption key information to wireless LAN base station apparatus 800, and a terminal-side transmitting/receiving section 110 that receives a GTK counter value incremented when a frame encrypted by means of a GTK as already transmitted encryption key information is transmitted together with message 2 in an IEEE802.11i standard or WPA standard 4-way handshake procedure; and the control section transmits a Key MIC calculated based on a PTK as the encryption key information and the GTK count value, and the GTK count value, included in a message 3 EAPoL-Key frame.

Also, according to Embodiment 3, wireless LAN base station apparatus 800 that performs encrypted communication with communication terminal 300 using encryption key information which has been distributed from Access controller 700 serving as a key distribution control apparatus is provided with a terminal-side transmitting/receiving section 260 that receives message 2 and message 4 in an IEEE802.11i standard or WPA standard 4-way handshake procedure from communication terminal 300, and a frame processing section 810 that, when the message 2 or message 4 is received, transmits a GTK counter value, incremented when a frame encrypted by means of a GTK serving as the encryption key information is transmitted, to Access controller 700 serving as a key distribution apparatus.

Embodiment 4

In Embodiment 1 through Embodiment 3, wireless LAN base station apparatus 200, wireless LAN base station apparatus 600, and wireless LAN base station apparatus 800 have an encryption/decryption function. However, both an Access controller and a wireless LAN base station apparatus may have an encryption/decryption function in communication with a communication terminal 300. This embodiment relates to a communication system in which both an Access controller and a wireless LAN base station apparatus may have an encryption/decryption function in communication with a communication terminal 300 in this way. In particular, a communication system of this embodiment determines for each wireless LAN base station apparatus whether the Access controller or the wireless LAN base station apparatus performs encryption/decryption processing.

Figure 14:
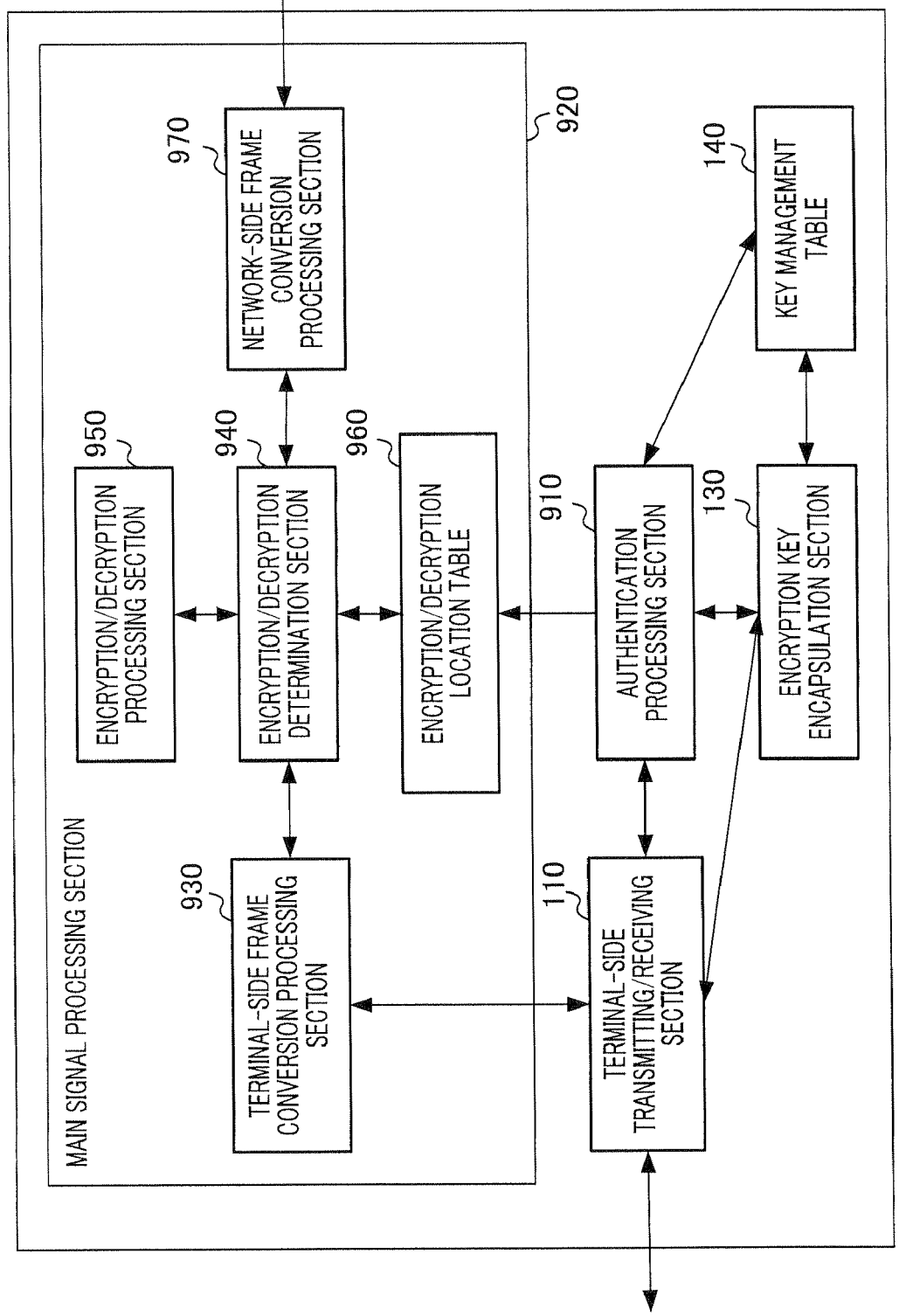
FIG. 14 is a block diagram showing the configuration of an Access controller according to Embodiment 4.

As shown in FIG. 14, an Access controller 900 of Embodiment 4 has an authentication processing section 910 and a main signal processing section 920. This main signal processing section 920 has a terminal-side frame conversion processing section 930, an encryption/decryption determination section 940, an encryption/decryption processing section 950, an encryption/decryption location table 960, and a network-side frame conversion processing section 970.

A communication system of this embodiment is composed of an above-described Access controller 900, wireless LAN base station apparatuses 200, and communication terminates 300.

Figure 15:
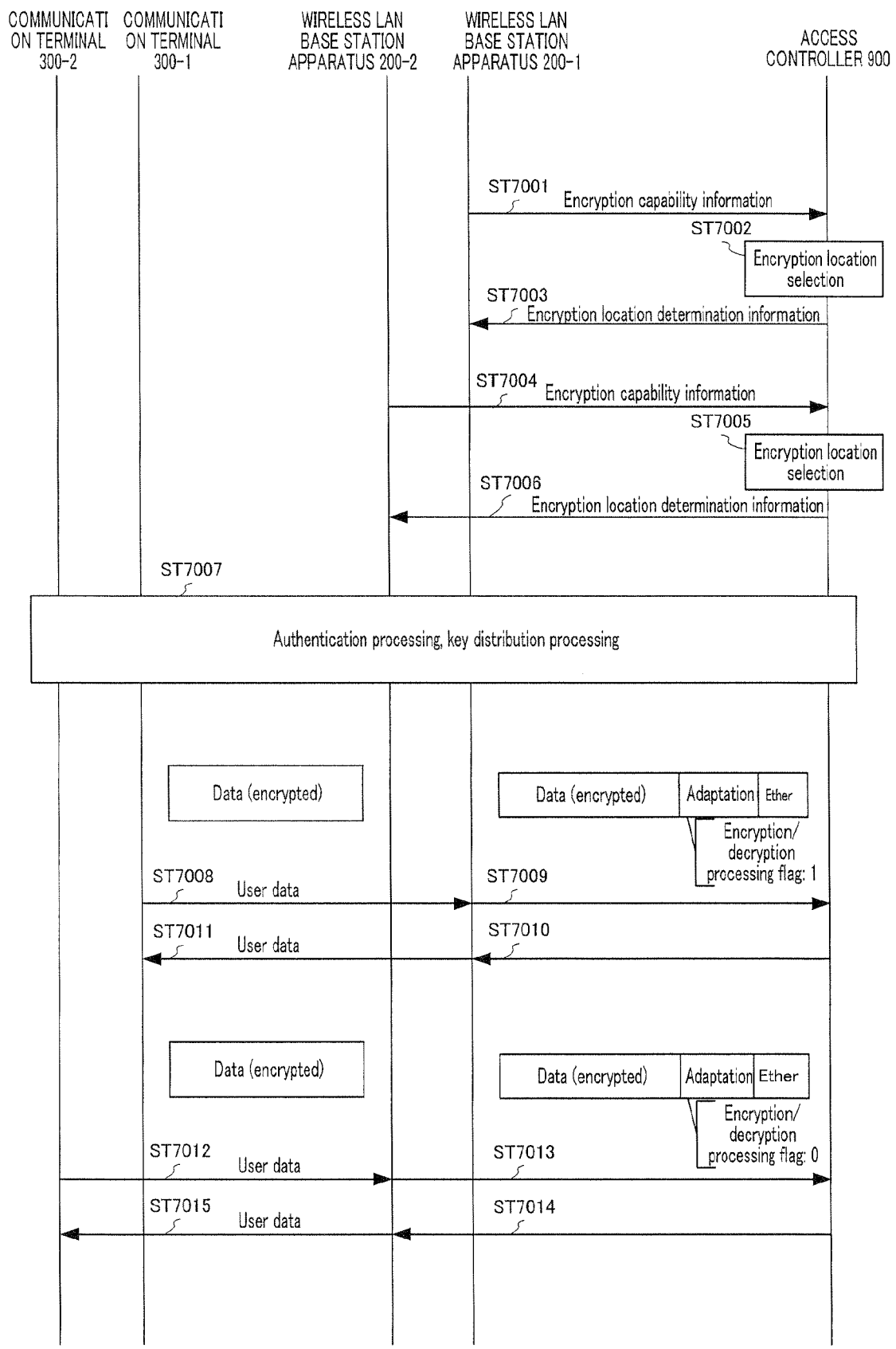
FIG. 15 is a chart explaining the operation of a communication system of Embodiment 4.

Next, the operation of a communication system having the above configuration will be described with reference to FIG. 15. To simplify the explanation, a case will here be described in which the communication system is composed of one Access controller 900, two wireless LAN base station apparatuses 200 (wireless LAN base station apparatus 200-1 and wireless LAN base station apparatus 200-2), and two communication terminates 300 (communication terminal 300-1 and communication terminal 300-2).

In step ST7001, wireless LAN base station apparatus 200-1, when connected to Access controller 900, transmits encryption capability information indicating whether or not it has an encryption/decryption function.

In step ST7002, Access controller 900 receives the encryption capability information from wireless LAN base station apparatus 200-1, and if this encryption capability information indicates that wireless LAN base station apparatus 200-1 has an encryption/decryption function, performs encryption location selection. Specifically, in Access controller 900, on receiving the above-described encryption capability information via terminal-side transmitting/receiving section 110, authentication processing section 910 determines whether to entrust encryption/decryption processing to wireless LAN base station apparatus 200-1, which transmitted that encryption capability information, or to have encryption/decryption processing performed by Access controller 900 itself. The result of this determination is then taken as encryption location determination information.

In step ST7003, authentication processing section 910 in Access controller 900 reflects the encryption location determination information in encryption/decryption location table 960, and also transmits the encryption location determination information to wireless LAN base station apparatus 200-1 via terminal-side transmitting/receiving section 110. It will here be assumed that it has been determined that Access controller 900 will perform encryption/decryption processing for wireless LAN base station apparatus 200-1.

In step ST7004, wireless LAN base station apparatus 200-2, when connected to Access controller 900, transmits encryption capability information indicating whether or not it has an encryption/decryption function.

In step ST7005, Access controller 900 receives the encryption capability information from wireless LAN base station apparatus 200-2, and if this encryption capability information indicates that wireless LAN base station apparatus 200-2 has an encryption/decryption function, performs encryption location selection.

In step ST7006, authentication processing section 910 in Access controller 900 reflects the encryption location determination information in the encryption/decryption location table, and also transmits the encryption location determination information to wireless LAN base station apparatus 200-2 via terminal-side transmitting/receiving section 110. It will here be assumed that it has been determined that wireless LAN base station apparatus 200-2 will perform encryption/decryption processing for wireless LAN base station apparatus 200-2.

In step ST7007, authentication processing and key distribution processing such as described in Embodiment 1 are performed in the communication system of this embodiment. The method in Embodiment 2 or 3 may also be used for this authentication processing and key distribution processing.

Encrypted communication between Access controller 900, wireless LAN base station apparatuses 200, and communication terminates 300 is made possible by means of above-described step ST7001 through step ST7007.

Then, when transmit data is generated by communication terminal 300-1, user data encrypted using an already distributed encryption key is transmitted to wireless LAN base station apparatus 200-1 serving communication terminal 300-1 (step ST7008).

In wireless LAN base station apparatus 200-1, frame processing section 220 performs processing of user data transmitted from communication terminal 300-1 according to encryption location determination information received from Access controller 900.

Specifically, when encryption location determination information received by wireless LAN base station apparatus 200-1 from Access controller 900 indicates that encryption/decryption processing is to be performed by wireless LAN base station apparatus 200-1, frame processing section 220 adds information indicating that encryption/decryption processing has been performed by wireless LAN base station apparatus 200-1 to the adaptation header added when user data on which decryption processing has been performed is transferred to Access controller 900. For example, an encryption/decryption processing flag in the adaptation header is set to 0.

On the other hand, when encryption location determination information received by wireless LAN base station apparatus 200-1 from Access controller 900 indicates that encryption/decryption processing is to be performed by Access controller 900, frame processing section 220 adds information indicating that encryption/decryption processing is to be performed by Access controller 900 to the adaptation header added when user data transmitted from communication terminal 300-1 is transferred directly. For example, the encryption/decryption processing flag in the adaptation header is set to 1.

Since, of wireless LAN base station apparatus 200-1 and Access controller 900, encryption/decryption processing is here performed by Access controller 900, wireless LAN base station apparatus 200-1 performs transmission to Access controller 900 with the encryption/decryption processing flag in the adaptation header set to 1 (step ST7009).

In Access controller 900, user data from wireless LAN base station apparatus 200-1 is received by terminal-side transmitting/receiving section 110. Then terminal-side frame conversion processing section 930 outputs encryption/decryption processing flag information included in the adaptation header added to that user data, and the user data itself with the header removed, to encryption/decryption determination section 940.

Encryption/decryption determination section 940 performs processing according to the received encryption/decryption processing flag. Specifically, when the encryption/decryption processing flag is 1—that is, when the encryption/decryption processing flag indicates that user data decryption is to be performed by Access controller 900—user data is output to encryption/decryption processing section 950 and decryption processing is caused to be performed there, and user data that has undergone decryption processing is output to network-side frame conversion processing section 970. Then network-side frame conversion processing section 970 performs frame conversion processing on the user data in line with the network-side network form, and transmits the user data to the network-side network. When the encryption/decryption processing flag is 0—that is, when the encryption/decryption processing flag indicates that user data decryption has been performed by wireless LAN base station apparatus 200-1—it is not necessary for decryption processing to be performed by Access controller 900, and therefore encryption/decryption determination section 940 outputs user data received from terminal-side frame conversion processing section 930 directly to network-side frame conversion processing section 970.

Next, it will be assumed that Access controller 900 has received a frame from the network-side network. Network-side frame conversion processing section 970 in Access controller 900 then receives this frame and converts it to a wireless LAN frame, and outputs this wireless LAN frame to encryption/decryption determination section 940.

Encryption/decryption determination section 940 looks at the second address of the wireless LAN frame header (IEEE802.11 header), and determines the wireless LAN base station apparatus 200 that this wireless LAN frame will pass through. Then encryption/decryption determination section 940 references encryption/decryption location table 960, and performs processing according to encryption location determination information corresponding to the determined wireless LAN base station apparatus 200.

That is to say, when encryption location determination information corresponding to the determined wireless LAN base station apparatus 200 indicates that encryption/decryption processing is performed by Access controller 900, encryption/decryption determination section 940 outputs a wireless LAN frame to encryption/decryption processing section 950 and causes encryption processing to be performed, and transmits the wireless LAN frame that has undergone encryption processing to wireless LAN base station apparatus 200 via terminal-side frame conversion processing section 930 and terminal-side transmitting/receiving section 110.

On the other hand, when encryption location determination information corresponding to the determined wireless LAN base station apparatus 200 indicates that encryption/decryption processing is performed by wireless LAN base station apparatus 200, encryption/decryption determination section 940 transmits a wireless LAN frame directly to wireless LAN base station apparatus 200 via terminal-side frame conversion processing section 930 and terminal-side transmitting/receiving section 110. An Ether header and adaptation header are added to the wireless LAN frame by terminal-side frame conversion processing section 930.

Assuming here that the wireless LAN base station apparatus 200 that a wireless LAN frame passes through is wireless LAN base station apparatus 200-1, since it has been established that, of wireless LAN base station apparatus 200-1 and Access controller 900, encryption/decryption processing is performed by Access controller 900, Access controller 900 performs encryption processing as described above and transmits the wireless LAN frame to wireless LAN base station apparatus 200-1 (step ST7010).

In wireless LAN base station apparatus 200-1, since encryption location determination information indicating that, of wireless LAN base station apparatus 200-1 and Access controller 900, encryption/decryption processing is to be performed by Access controller 900 has already been received from Access controller 900, frame processing section 220 transfers the wireless LAN frame to communication terminal 300-1 without performing any special processing apart from removing the Ether header and adaptation header from the received frame (step ST7011).

Then, when transmit data is generated by communication terminal 300-2, user data encrypted using an already distributed encryption key is transmitted to wireless LAN base station apparatus 200-2 serving communication terminal 300-2 (step ST7012).

In wireless LAN base station apparatus 200-2, encryption location determination information has been received indicating that, of wireless LAN base station apparatus 200-2 and Access controller 900, encryption/decryption processing is to be performed by wireless LAN base station apparatus 200-2. Therefore, wireless LAN base station apparatus 200-2 decrypts encrypted user data from communication terminal 300-2, and transmits that user data to Access controller 900 with the encryption/decryption processing flag in the adaptation header set to 0 (step ST7013).

In Access controller 900, when the encryption/decryption processing flag is 0—that is, when the encryption/decryption processing flag indicates that user data decryption has been performed by wireless LAN base station apparatus 200-2—it is not necessary for decryption processing to be performed by Access controller 900, and therefore encryption/decryption determination section 940 outputs user data received from terminal-side frame conversion processing section 930 directly to network-side frame conversion processing section 970.

Next, it will be assumed that Access controller 900 has received a frame from the network-side network. Assuming here that the wireless LAN base station apparatus 200 that a wireless LAN frame passes through is wireless LAN base station apparatus 200-2, since it has been established that, of wireless LAN base station apparatus 200-2 and Access controller 900, encryption/decryption processing is performed by wireless LAN base station apparatus 200, Access controller 900 transmits the wireless LAN frame directly to wireless LAN base station apparatus 200-2 via terminal-side frame conversion processing section 930 and terminal-side transmitting/receiving section 110, without performing encryption processing as described above (step ST7014).

In wireless LAN base station apparatus 200-2, since encryption location determination information has already been received from Access controller 900 indicating that, of wireless LAN base station apparatus 200-2 and Access controller 900, encryption/decryption processing is to be performed by wireless LAN base station apparatus 200-2, frame processing section 220 removes the Ether header and adaptation header from the received frame, executes encryption processing, and transfers the wireless LAN frame to communication terminal 300-2 (step ST7015).

Embodiment 5

In Embodiment 4, it was determined for each wireless LAN base station apparatus whether the Access controller or the wireless LAN base station apparatus performs encryption/decryption processing. In Embodiment 5, on the other hand, it is determined for each communication terminal served by one wireless LAN base station apparatus whether the Access controller or the wireless LAN base station apparatus performs encryption/decryption processing.

Figure 16:
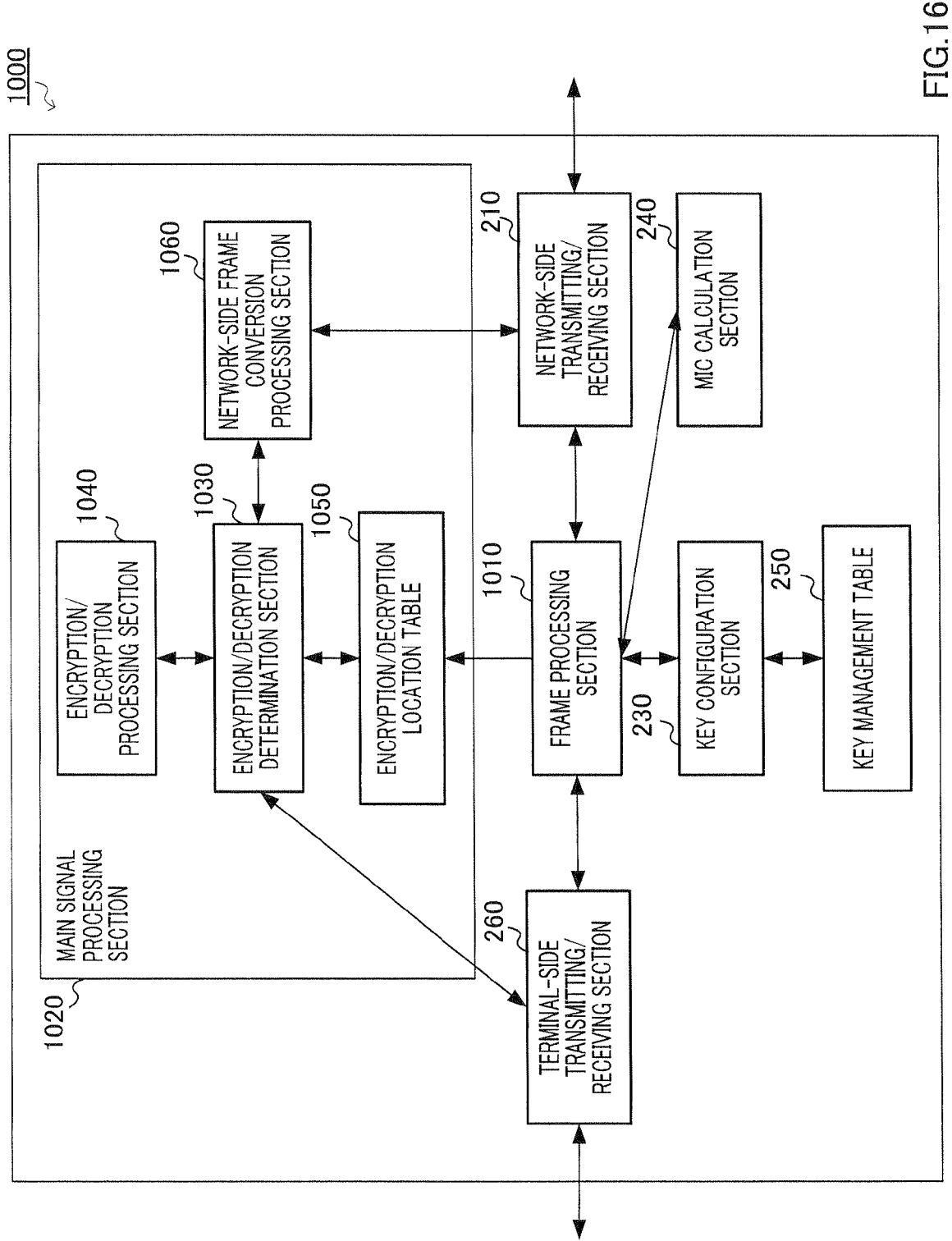
FIG. 16 is a block diagram showing the configuration of a wireless LAN base station apparatus according to Embodiment 5.

As shown in FIG. 16, a wireless LAN base station apparatus 1000 of Embodiment 5 has a frame processing section 1010 and a main signal processing section 1020. This main signal processing section 1020 has an encryption/decryption determination section 1030, an encryption/decryption processing section 1040, an encryption/decryption location table 1050, and a network-side frame conversion processing section 1060.

A communication system of this embodiment is composed of an Access controller 900, wireless LAN base station apparatuses 1000, and communication terminates 300.

Figure 17:
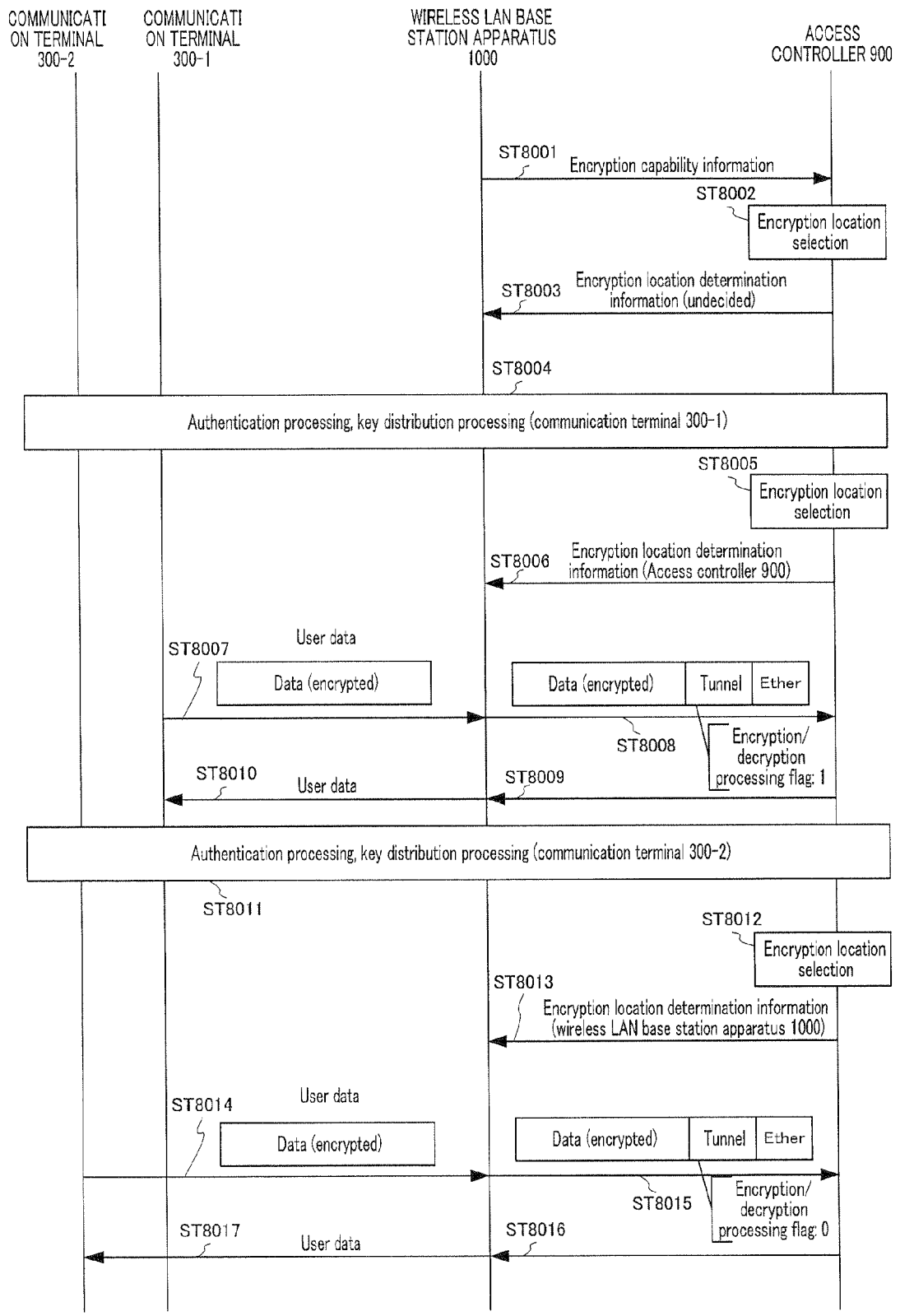
FIG. 17 is a chart explaining the operation of a communication system of Embodiment 5.

Next, the operation of a communication system having the above configuration will be described with reference to FIG. 17. To simplify the explanation, a case will here be described in which the communication system is composed of one Access controller 900, one wireless LAN base station apparatus 1000, and two communication terminates 300 (communication terminal 300-1 and communication terminal 300-2).

In step ST8001, wireless LAN base station apparatus 1000, when connected to Access controller 900, transmits encryption capability information indicating whether or not it has an encryption/decryption function.

In step ST8002, Access controller 900 receives the encryption capability information from wireless LAN base station apparatus 1000, and if this encryption capability information indicates that wireless LAN base station apparatus 1000 has an encryption/decryption function, performs encryption location selection. Specifically, in Access controller 900, on receiving the above-described encryption capability information via terminal-side transmitting/receiving section 110, authentication processing section 910 determines whether to entrust encryption/decryption processing to wireless LAN base station apparatus 1000, which transmitted that encryption capability information, or to have encryption/decryption processing performed by Access controller 900 itself. The result of this determination is then taken as encryption location determination information.

In step ST8003, authentication processing section 910 in Access controller 900 reflects the encryption location determination information in the encryption/decryption location table, and also transmits the encryption location determination information to wireless LAN base station apparatus 1000 via terminal-side transmitting/receiving section 110. It will here be assumed that it has been determined that whether encryption/decryption processing for wireless LAN base station apparatus 1000 is to be performed by Access controller 900 or by wireless LAN base station apparatus 1000 is undecided.

In step ST8004, authentication processing and key distribution processing such as described in Embodiment 1 are performed for communication terminal 300-1. The method in Embodiment 2 or 3 may also be used for this authentication processing and key distribution processing.

Then in step ST8005, encryption location selection is performed for communication terminal 300-1. That is to say, it is determined whether encryption/decryption processing for communication terminal 300-1 is to be entrusted to wireless LAN base station apparatus 1000 or is to be performed by Access controller 900 itself.

In step ST8006, authentication processing section 910 in Access controller 900 reflects the encryption location determination information in encryption/decryption location table 960, and also transmits the encryption location determination information to wireless LAN base station apparatus 1000 via terminal-side transmitting/receiving section 110. It will here be assumed that it has been determined that Access controller 900 will perform encryption/decryption processing for communication terminal 300-1.

In wireless LAN base station apparatus 1000, frame processing section 1010 receives encryption location determination information via network-side transmitting/receiving section 210. Then frame processing section 1010 reflects encryption location determination information relating to communication terminal 300-1 in encryption/decryption location table 1050.

Then, when transmit data is generated by communication terminal 300-1, user data encrypted using an already distributed encryption key is transmitted to wireless LAN base station apparatus 1000 serving communication terminal 300-1 (step ST8007).

In wireless LAN base station apparatus 1000, a wireless LAN frame as user data from communication terminal 300-1 is received by terminal-side transmitting/receiving section 260. Then encryption/decryption determination section 1030 references encryption/decryption location table 1050, and performs processing according to encryption location determination information relating to the communication terminal 300 corresponding to the transmission source address of that wireless LAN frame.

That is to say, when encryption location determination information relating to the communication terminal 300 corresponding to the transmission source address of that wireless LAN frame indicates that encryption/decryption processing is performed by wireless LAN base station apparatus 1000, encryption/decryption determination section 1030 outputs the wireless LAN frame to encryption/decryption processing section 1040 and causes decryption processing to be performed, and transmits the wireless LAN frame that has undergone decryption processing to Access controller 900 via network-side frame conversion processing section 1060 and network-side transmitting/receiving section 210. An Ether header and adaptation header are added to the wireless LAN frame by network-side frame conversion processing section 1060, and information indicating that encryption/decryption processing has been performed by wireless LAN base station apparatus 1000 is added to this adaptation header. For example, an encryption/decryption processing flag in the adaptation header is set to 0.

On the other hand, when encryption location determination information relating to the communication terminal 300 corresponding to the transmission source address of that wireless LAN frame indicates that encryption/decryption processing is to be performed by Access controller 900, encryption/decryption determination section 1030 transmits the wireless LAN frame directly to Access controller 900 via network-side frame conversion processing section 1060 and network-side transmitting/receiving section 210. An Ether header and adaptation header are added to the wireless LAN frame by network-side frame conversion processing section 1060, and information indicating that encryption/decryption processing is to be performed by Access controller 900 is added to this adaptation header. For example, the encryption/decryption processing flag in the adaptation header is set to 1.

Since, of wireless LAN base station apparatus 1000 and Access controller 900, encryption/decryption processing for communication terminal 300-1 is here performed by Access controller 900, wireless LAN base station apparatus 1000 performs transmission to Access controller 900 with the encryption/decryption processing flag in the adaptation header set to 1 (step ST8008).

In Access controller 900, a frame from wireless LAN base station apparatus 1000 is received by terminal-side transmitting/receiving section 110. Then terminal-side frame conversion processing section 930 outputs encryption/decryption processing flag information included in the adaptation header added to that frame, and the user data itself with the header removed, to encryption/decryption determination section 940.

Encryption/decryption determination section 940 performs processing according to the received encryption/decryption processing flag. Specifically, when the encryption/decryption processing flag is 1—that is, when the encryption/decryption processing flag indicates that user data decryption is to be performed by Access controller 900—user data is output to encryption/decryption processing section 950 and decryption processing is caused to be performed there, and user data that has undergone decryption processing is output to network-side frame conversion processing section 970. Then network-side frame conversion processing section 970 performs frame conversion processing on the user data in line with the network-side network form, and transmits the user data to the network-side network. When the encryption/decryption processing flag is 0—that is, when the encryption/ decryption processing flag indicates that user data decryption has been performed by wireless LAN base station apparatus 1000—it is not necessary for decryption processing to be performed by Access controller 900, and therefore encryption/decryption determination section 940 outputs user data received from terminal-side frame conversion processing section 930 directly to network-side frame conversion processing section 970.

Next, it will be assumed that Access controller 900 has received a frame from the network-side network. Network-side frame conversion processing section 970 in Access controller 900 then receives this frame and converts it to a wireless LAN frame, and outputs this wireless LAN frame to encryption/decryption determination section 940.

Encryption/decryption determination section 940 looks at the first address of the wireless LAN frame header (IEEE802.11 header), and determines the communication terminal 300 that is the destination of this wireless LAN frame. Then encryption/decryption determination section 940 references encryption/decryption location table 960, and performs processing according to encryption location determination information corresponding to the determined communication terminal 300.

That is to say, when encryption location determination information corresponding to the determined communication terminal 300 indicates that encryption/decryption processing is performed by Access controller 900, encryption/decryption determination section 940 outputs a wireless LAN frame to encryption/decryption processing section 950 and causes encryption processing to be performed, and transmits the wireless LAN frame that has undergone encryption processing to wireless LAN base station apparatus 1000 via terminal-side frame conversion processing section 930 and terminal-side transmitting/receiving section 110. An Ether header and adaptation header are added to the wireless LAN frame by terminal-side frame conversion processing section 930, and information indicating that encryption/decryption processing has been performed by Access controller 900 is added to this adaptation header. For example, an encryption/decryption processing flag in the adaptation header is set to 0.

On the other hand, when encryption location determination information corresponding to the determined communication terminal 300 indicates that encryption/decryption processing is performed by wireless LAN base station apparatus 1000, encryption/decryption determination section 940 transmits a wireless LAN frame directly to wireless LAN base station apparatus 1000 via terminal-side frame conversion processing section 930 and terminal-side transmitting/receiving section 110. An Ether header and adaptation header are added to the wireless LAN frame by terminal-side frame conversion processing section 930, and information indicating that encryption/decryption processing is to be performed by wireless LAN base station apparatus 1000 is added to this adaptation header. For example, the encryption/decryption processing flag in the adaptation header is set to 1.

Assuming here that the wireless LAN frame destination is communication terminal 300-1, since it has been established that, of wireless LAN base station apparatus 1000 and Access controller 900, encryption/decryption processing for communication terminal 300-1 is to be performed by Access controller 900, Access controller 900 performs encryption processing as described above and transmits a wireless LAN frame to wireless LAN base station apparatus 1000 (step ST8009). At this time, information indicating that encryption/decryption processing has been performed by Access controller 900 has been added to the adaptation header. That is to say, the encryption/decryption processing flag is 0.

In wireless LAN base station apparatus 1000, a frame from Access controller 900 is received by network-side frame conversion processing section 1060 via network-side transmitting/receiving section 210. Then network-side frame conversion processing section 1060 outputs encryption/decryption processing flag information included in the adaptation header added to that frame, and the user data itself with the header removed, to encryption/decryption determination section 1030.

Encryption/decryption determination section 1030 performs processing according to the received encryption/decryption processing flag. Specifically, when the encryption/decryption processing flag is 1—that is, when the encryption/decryption processing flag indicates that user data encryption is to be performed by wireless LAN base station apparatus 1000—the frame is output to encryption/decryption processing section 1040 and encryption processing is caused to be performed there, and a wireless LAN frame that has undergone encryption processing is output to terminal-side transmitting/receiving section 260. Terminal-side transmitting/receiving section 260 transmits the wireless LAN frame that has undergone encryption processing to communication terminal 300-1 (step ST8010). When the encryption/decryption processing flag is 0—that is, when the encryption/decryption processing flag indicates that frame encryption has been performed by Access controller 900—it is not necessary for encryption processing to be performed by wireless LAN base station apparatus 1000, and therefore encryption/decryption determination section 1030 outputs the frame received from network-side frame conversion processing section 1060 directly to communication terminal 300-1 via terminal-side transmitting/receiving section 260.

In step ST8011, authentication processing and key distribution processing such as described in Embodiment 1 are performed in the communication system of this embodiment for communication terminal 300-2. The method in Embodiment 2 or 3 may also be used for this authentication processing and key distribution processing.

In step ST8012, encryption location selection is performed for communication terminal 300-2. That is to say, it is determined whether encryption/decryption processing for communication terminal 300-2 is to be entrusted to wireless LAN base station apparatus 1000 or is to be performed by Access controller 900 itself.

In step ST8013, authentication processing section 910 in Access controller 900 reflects the encryption location determination information in encryption/decryption location table 960, and also transmits the encryption location determination information to wireless LAN base station apparatus 1000 via terminal-side transmitting/receiving section 110. It will here be assumed that it has been determined that wireless LAN base station apparatus 1000 will perform encryption/decryption processing for communication terminal 300-2.

In wireless LAN base station apparatus 1000, frame processing section 1010 receives encryption location determination information via network-side transmitting/receiving section 210. Then frame processing section 1010 reflects encryption location determination information relating to communication terminal 300-2 in encryption/decryption location table 1050.

Then, when transmit data is generated by communication terminal 300-2, user data encrypted using an already distributed encryption key is transmitted to wireless LAN base station apparatus 1000 serving communication terminal 300-2 (step ST8014).

In wireless LAN base station apparatus 1000, a wireless LAN frame as user data from communication terminal 300-2 is received by terminal-side transmitting/receiving section 260. Then encryption/decryption determination section 1030 references encryption/decryption location table 1050, and performs processing according to encryption location determination information relating to the communication terminal 300 corresponding to the transmission source address of that wireless LAN frame.

Since, of wireless LAN base station apparatus 1000 and Access controller 900, encryption/decryption processing for communication terminal 300-2 is here performed by wireless LAN base station apparatus 1000, wireless LAN base station apparatus 1000 sets the encryption/decryption processing flag in the adaptation header added to the post-decryption wireless LAN frame to 0, and transmits the wireless LAN frame to Access controller 900 (step ST8015).

In Access controller 900, a frame from wireless LAN base station apparatus 1000 is received by terminal-side transmitting/receiving section 110. Then terminal-side frame conversion processing section 930 outputs encryption/decryption processing flag information included in the adaptation header added to that frame, and the user data itself with the header removed, to encryption/decryption determination section 940.

Encryption/decryption determination section 940 performs processing according to the received encryption/decryption processing flag. Here, since the encryption/decryption processing flag is 0, encryption/decryption determination section 940 outputs user data received from terminal-side frame conversion processing section 930 directly to network-side frame conversion processing section 970.

Next, it will be assumed that Access controller 900 has received a frame from the network-side network. Network-side frame conversion processing section 970 in Access controller 900 then receives this frame and converts it to a wireless LAN frame, and outputs this wireless LAN frame to encryption/decryption determination section 940.

Encryption/decryption determination section 940 looks at the first address of the wireless LAN frame header (IEEE802.11 header), and determines the communication terminal 300 that is the destination of this wireless LAN frame. Then encryption/decryption determination section 940 references encryption/decryption location table 960, and performs processing according to encryption location determination information corresponding to the determined communication terminal 300. Since the encryption location determination information corresponding to the determined communication terminal 300 (communication terminal 300-2) here indicates that encryption/decryption processing is performed by wireless LAN base station apparatus 1000, encryption/decryption determination section 940 transmits the wireless LAN frame directly to wireless LAN base station apparatus 1000 via terminal-side frame conversion processing section 930 and terminal-side transmitting/receiving section 110 (step ST8016). The encryption/decryption processing flag in the adaptation header is set to 1 by terminal-side frame conversion processing section 930.

In wireless LAN base station apparatus 1000, the frame from Access controller 900 is received by network-side frame conversion processing section 1060 via network-side transmitting/receiving section 210. Then network-side frame conversion processing section 1060 outputs encryption/decryption processing flag information included in the adaptation header added to that frame, and the user data itself with the header removed, to encryption/decryption determination section 1030.

Encryption/decryption determination section 1030 performs processing according to the received encryption/decryption processing flag. Here, since the encryption/decryption processing flag is 1, encryption/decryption determination section 1030 outputs the frame to encryption/decryption processing section 1040 and causes encryption processing to be performed there, and outputs a wireless LAN frame that has undergone encryption processing to terminal-side transmitting/receiving section 260. Terminal-side transmitting/receiving section 260 transmits the wireless LAN frame that has undergone encryption processing to communication terminal 300-2 (step ST8017).

Thus, in a communication system of this embodiment, encryption/decryption location assignment can be changed between wireless LAN base station apparatus 1000 and Access controller 900 for each communication terminal 300. Also, encryption location determination information can be sent not only after authentication but at any time, and from either wireless LAN base station apparatus 1000 or Access controller 900, to enable the encryption/decryption location to be changed. For example, if the Access controller 900 load has become heavy, it is possible to monitor a value representing a certain load and to switch part of the encryption/decryption processing to wireless LAN base station apparatus 1000 if that value exceeds a threshold value.

Other Embodiments

In Embodiment 1 through Embodiment 3, wireless LAN base station apparatus 200, wireless LAN base station apparatus 600, and wireless LAN base station apparatus 800 have an encryption/decryption function. However, Access controller 100, Access controller 500, and Access controller 700 may also have an encryption/decryption function in communication with a communication terminal 300.

In this case, since Access controller 100, Access controller 500, and Access controller 700 have an encryption/decryption function and an authentication function, wireless LAN base station apparatus 200, wireless LAN base station apparatus 600, and wireless LAN base station apparatus 800 do not need to store a PTK or GTK, and can allow all frames to pass through.

The present application is based on Japanese Patent Application No. 2005-060517 filed on Mar. 4, 2005, and Japanese Patent Application No. 2005-092199 filed on Mar. 28, 2005, entire content of which is expressly incorporated herein by reference.

INDUSTRIAL APPLICABILITY

A key distribution control apparatus and radio base station apparatus of the present invention have an effect of improving security in a radio communication system, and are useful, in particular, for an access point and access point control apparatus in a wireless LAN system.

The invention claimed is:
1. A key distribution control apparatus configured to transmit encryption key information used in communication between a communication terminal and a radio base station apparatus, said key distribution control apparatus comprising:
   a control section configured to generate said encryption key information and configured to transmit said encryption key information at the same time as a message used in a WPA standard 4-way handshake procedure or group key handshake procedure; and a transmitting section configured to transmit information from said control section, wherein said control section is further configured to transmit GTK use information at the same time as said message, the GTK use information indicating whether an existing GTK is to be transmitted or a newly generated GTK is to be transmitted, the existing GTK or the newly generated GTK serving as said encryption key information.

2. The key distribution control apparatus according to claim 1, wherein said control section, transmits a Key MIC when said GTK use information indicates a new GTK, and wherein an EAPoL-Key frame includes a PTK and said Key MIC, said PTK serving as said encryption key information and said Key MIC being calculated based on said PTK and said GTK use information.

3. A key distribution control apparatus configured to transmit encryption key information used in communication between a communication terminal and a radio base station apparatus, said key distribution control apparatus comprising:

a control section configured to generate said encryption key information and configured to transmit the encryption key information at the same time as a message used in a WPA standard 4-way handshake procedure or group key handshake procedure; and a transmitting section configured to transmit information from said control section, wherein said control section, upon termination of said 4-way handshake procedure or said group key handshake procedure, is further configured to transmit control information constituting a trigger for using the encryption key information in communication between said radio base station apparatus and said communication terminal.

4. A radio base station apparatus comprising:

a receiving section configured to receive encryption key information, GTK use information, and an EAPoL-Key frame; and a control section configured to:

control transmission of said EAPoL-Key frame to a communication, terminal;

store a GTK count value in said EAPoL-Key frame, said GTK count value being set to (i) a number of times an encrypted frame has been transmitted to another communication terminal in said EAPoL-Key frame when said GTK use information indicates an existing GTK, said encrypted frame being a frame encrypted by use of said existing GTK serving as said encryption key information and (ii) zero when said GTK use information indicates a new GTK;

store a Key MIC value calculated based on said EAPoL-Key frame including said GTK count value and a PTK serving as said encryption key information; and transmit said EAPoL-Key frame including said Key MIC value.

5. A radio base station apparatus comprising:

a receiving section configured to receive encryption key information, GTK use information, and an EAPoL-Key frame; and a control section configured to:
(i) when said GTK use information indicates an existing GTK,
control transfer of said EAPoL-Key frame to a communication
terminal;
store a GTK count value in said EAPoL-Key frame, said GTK count value representing a number of times an encrypted frame has been transmitted to another communication terminal, said encrypted frame being encrypted by use of the existing GTK serving as said encryption key information;
store a Key MIC calculated based on said EAPoL-Key frame including said GTK count value and a PTK serving as said encryption key information;
transmit said EAPoL-Key frame, said Key MIC being included in said EAPoL-Key frame; and
(ii) when said GTK use information indicates a new GTK, transmit said EAPoL-Key frame.

6. A communication system comprising:

a radio base station apparatus; and a key distribution control apparatus configured to transmit encryption key information used in communication between a communication terminal and said radio base station apparatus, said key distribution control apparatus including:

a control section configured to generate said encryption key information and transmit said encryption key information at the same time as sending a message in a WPA standard 4-way handshake procedure or group key handshake procedure; and a transmitting section configured to transmit information from said control section;

said radio base station apparatus including:

a section configured to temporarily store encryption key information transmitted from said key distribution control apparatus; and a control section configured to apply said temporarily stored encryption key information to communication with said communication terminal based on a received message in said 4-way handshake procedure or group key handshake procedure, the received message acting as a trigger.

7. A communication system comprising:

a radio base station apparatus; and a key distribution control apparatus configured to transmit encryption key information used in communication between a communication terminal and said radio base station apparatus, said key distribution control apparatus including:

a control section configured to generate said encryption key information and transmit said encryption key information at the same time as sending a message in a WPA standard 4-way handshake procedure or group key handshake procedure, wherein said control section is further configured to control information constituting a trigger for applying encryption key information transmitted to said radio base station apparatus used in communication with said communication terminal upon termination of said 4-way handshake procedure or said group key handshake procedure; and a transmitting section configured to transmit information from said control section; and said radio base station apparatus including:
- a section configured to temporarily store encryption key information transmitted from said key distribution control apparatus; and
- a control section configured to apply said temporarily stored encryption key information used in communication with said communication terminal based on said control information transmitted from said key distribution control apparatus.

8. A key distribution control apparatus configured to distribute encryption key information used in communication between a communication terminal and a radio base station apparatus, said key distribution control apparatus comprising:
- a control section configured to generate said encryption key information and transmit said encryption key information to said radio base station apparatus; and
- a receiving section configured to receive a GTK count value incremented when an encrypted frame is transmitted, said encrypted frame being encrypted by use of a GTK serving as said encryption key information,
- wherein said control section is further configured to transmit a Key MIC calculated based on said GTK count value and a PTK, said GTK included in a message 3 EAPoL-Key frame, and the PTK serving as said encryption key information.

9. A radio base station apparatus configured to perform encrypted communication with a communication terminal using encryption key information, said encryption key information distribution has been received from a key distribution control apparatus, said radio base station apparatus comprising:
- a receiving section configured to receive a message 2 and a message 4 conforming to the 802.11i standard from said communication terminal; and
- a transmission control section configured to transmit a GTK count value when said message 2 or said message 4 is received, the GTK count value being incremented when an encrypted frame is transmitted to said key distribution control apparatus, said encrypted frame being encrypted by use of a GTK serving as said encryption key information.

10. A communication system comprising:
a radio base station apparatus; and
a key distribution control apparatus configured to transmit encryption key information used in communication between a communication terminal and said radio base station apparatus,
said key distribution control apparatus comprises:
- a receiving section that configured to receive a GTK count value incremented when an encrypted frame is transmitted together with a first message 2 in a WPA standard 4-way handshake procedure, the encrypted frame being encrypted by use of a GTK serving as said encryption key information; and
- a control section configured to generate said encryption key information and transmit said encryption key information to said radio base station apparatus, and transmit a Key MIC, said Key MIC being calculated based on said GTK count value and a PTK serving as said encryption key information, said GTK count value being included in a message 3 EAPoL-Key frame; and said radio base station apparatus comprises:
- a receiving section configured to receive a second message 2 and a message 4 in said 4-way handshake procedure from said communication terminal; and
- a transmission control section configured to transmit said GTK count value to said key distribution control apparatus when said second message 2 or said message 4 is received.

* * * * *